(12) United States Patent
Hulbert et al.

(10) Patent No.: US 11,628,324 B2
(45) Date of Patent: *Apr. 18, 2023

(54) LONG-TERM FIRE RETARDANT WITH CORROSION INHIBITORS AND METHODS FOR MAKING AND USING SAME

(71) Applicant: FRS Group, LLC, Rocklin, CA (US)

(72) Inventors: Dennis Hulbert, Corvallis, MT (US); Robert J. Burnham, Stevensville, MT (US); Michael S. Schnarr, Roseville, CA (US); Gerald Geissler, Kailua-Kona, HI (US); David W. Wilkening, Ronan, MT (US); Joseph McLellan, Rocklin, CA (US); Michael White, Roseville, CA (US)

(73) Assignee: FRS Group, LLC, Rocklin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/821,060

(22) Filed: Aug. 19, 2022

(65) Prior Publication Data

US 2023/0001250 A1    Jan. 5, 2023

Related U.S. Application Data

(63) Continuation of application No. 17/552,196, filed on Dec. 15, 2021, now Pat. No. 11,420,084.

(Continued)

(51) Int. Cl.
*A62D 1/00* (2006.01)
*A62C 3/02* (2006.01)
*C01F 5/40* (2006.01)

(52) U.S. Cl.
CPC .............. *A62D 1/005* (2013.01); *A62C 3/02* (2013.01); *A62D 1/0007* (2013.01); *A62D 1/0035* (2013.01); *C01F 5/40* (2013.01)

(58) Field of Classification Search
CPC ..... A62D 1/005; A62D 1/0007; A62D 1/0035; A62C 3/02; C01F 5/40
See application file for complete search history.

(56) References Cited

U.S. PATENT DOCUMENTS

| 2,759,924 A | 8/1956 | Touey |
| 2,990,233 A | 6/1961 | Eugene et al. |

(Continued)

FOREIGN PATENT DOCUMENTS

| AU | 2018435573 A1 | 3/2021 |
| CA | 2494914 C | 1/2013 |

(Continued)

OTHER PUBLICATIONS

U.S. Appl. No. 16/894,231, filed Jun. 5, 2020, Hulbert et al.

(Continued)

*Primary Examiner* — Andrew J. Oyer
(74) *Attorney, Agent, or Firm* — Smith Baluch LLP

(57) ABSTRACT

A forest fire retardant composition contains a retardant compound that includes a phosphate salt. The phosphate salt may include diammonium phosphate, diammonium orthophosphate, monoammonium phosphate, monoammonium orthophosphate, monosodium phosphate, disodium phosphate, disodium phosphate hydrate, sodium ammonium phosphate, sodium ammonium phosphate hydrate, sodium tripolyphosphate, trisodium phosphate, or dipotassium phosphate, and combinations thereof. The forest fire retardant composition may include an ammonium source. The composition may be in the form of a dry concentrate, a liquid concentrate, or a final diluted product. The final diluted product is effective in suppressing, retarding, and controlling forest fires while exhibiting corrosion resistance and low toxicity.

34 Claims, 4 Drawing Sheets

Related U.S. Application Data

(60) Provisional application No. 63/140,657, filed on Jan. 22, 2021, provisional application No. 63/125,693, filed on Dec. 15, 2020.

(56) References Cited

U.S. PATENT DOCUMENTS

| | | |
|---|---|---|
| 3,223,649 A | 12/1965 | Langguth |
| 3,275,566 A | 9/1966 | Langguth |
| 3,293,189 A | 12/1966 | Morgenthaler |
| 3,338,829 A | 8/1967 | Langguth et al. |
| 3,342,749 A | 9/1967 | Handleman et al. |
| 3,350,305 A | 10/1967 | Langguth et al. |
| 3,364,149 A | 1/1968 | Morgenthaler |
| 3,382,186 A | 5/1968 | Silverstein |
| 3,409,550 A | 11/1968 | Gould |
| 3,585,135 A | 6/1971 | Smith et al. |
| 3,843,525 A | 10/1974 | Hattori et al. |
| 4,134,876 A | 1/1979 | Horner et al. |
| 4,134,959 A | 1/1979 | Menke et al. |
| 4,145,296 A | 3/1979 | Fox et al. |
| 4,168,239 A | 9/1979 | Mertz et al. |
| 4,176,071 A | 11/1979 | Crouch |
| 4,343,854 A | 8/1982 | Moorman |
| 4,374,171 A | 2/1983 | McCarter |
| 4,392,994 A | 7/1983 | Wagener |
| 4,770,794 A | 9/1988 | Cundasawmy et al. |
| 4,950,410 A | 8/1990 | Pennartz |
| 4,983,326 A | 1/1991 | Vandersall |
| 5,009,710 A | 4/1991 | Bewsey |
| 5,596,029 A | 1/1997 | Goebelbecker et al. |
| 5,849,210 A | 12/1998 | Pascente et al. |
| 5,985,013 A | 11/1999 | Kofler et al. |
| 6,019,176 A | 2/2000 | Crouch |
| 6,162,375 A | 12/2000 | Crouch et al. |
| 6,296,781 B1 | 10/2001 | Amiran |
| 6,447,697 B1 | 9/2002 | Vandersall |
| 6,517,747 B2 | 2/2003 | Vandersall |
| 6,802,994 B1 | 10/2004 | Kegeler et al. |
| 6,858,567 B2 | 2/2005 | Akao |
| 7,115,677 B2 | 10/2006 | Harashina et al. |
| 7,794,688 B2 | 9/2010 | Caine et al. |
| 8,212,073 B2 | 7/2012 | Kasowski |
| 8,871,058 B2 | 10/2014 | Sealey et al. |
| 9,919,174 B2 | 3/2018 | Vellmar |
| 9,982,195 B2 | 5/2018 | Matsui |
| 10,550,483 B2 | 2/2020 | Khosla et al. |
| 10,590,257 B2 | 3/2020 | Appel et al. |
| 10,752,840 B2 | 8/2020 | Cha et al. |
| 10,960,249 B2 | 3/2021 | Hulbert et al. |
| 10,960,250 B2 | 3/2021 | Hulbert et al. |
| 10,960,251 B1 | 3/2021 | Hulbert et al. |
| 11,041,063 B2 | 6/2021 | Hulbert et al. |
| 11,344,760 B2 | 5/2022 | Hulbert et al. |
| 11,395,934 B2 | 7/2022 | Hulbert et al. |
| 11,420,084 B2 | 8/2022 | Hulbert et al. |
| 11,534,643 B2 | 12/2022 | Hulbert et al. |
| 11,554,279 B2 | 1/2023 | Hubert et al. |
| 2002/0013403 A1 | 1/2002 | Vandersall |
| 2003/0010507 A1 | 1/2003 | Greiner et al. |
| 2004/0074650 A1 | 4/2004 | Shiga |
| 2004/0124403 A1 | 7/2004 | Parker et al. |
| 2005/0001197 A1 | 1/2005 | Clark |
| 2008/0196908 A1 | 8/2008 | Schaefer |
| 2010/0063180 A1 | 3/2010 | Kang et al. |
| 2011/0089386 A1 | 4/2011 | Berry et al. |
| 2011/0105649 A1 | 5/2011 | Harada et al. |
| 2011/0213065 A1 | 9/2011 | Giesselbach et al. |
| 2012/0219947 A1 | 8/2012 | Yurkovetsky et al. |
| 2012/0292551 A1 | 11/2012 | Klaffmo |
| 2013/0180738 A1 | 7/2013 | Kim et al. |
| 2013/0264509 A1 | 10/2013 | Shalev et al. |
| 2015/0352744 A1 | 12/2015 | Zhang et al. |
| 2015/0368560 A1 | 12/2015 | Pascal et al. |
| 2016/0030789 A1 | 2/2016 | Cordani |
| 2016/0264687 A1 | 9/2016 | Tran |
| 2017/0056698 A1 | 3/2017 | Pai et al. |
| 2018/0037998 A1* | 2/2018 | Khosla ............... C23F 11/167 |
| 2018/0282218 A1 | 10/2018 | Mabey |
| 2019/0153321 A1 | 5/2019 | Simonovic |
| 2019/0322939 A1* | 10/2019 | Kennedy ............... C09K 21/04 |
| 2020/0109253 A1 | 4/2020 | Appel et al. |
| 2020/0254290 A1 | 8/2020 | Robles et al. |
| 2020/0384298 A1 | 12/2020 | Hulbert et al. |
| 2020/0384299 A1 | 12/2020 | Hulbert et al. |
| 2021/0009787 A1 | 1/2021 | Hulbert et al. |
| 2021/0213318 A1 | 7/2021 | Hulbert et al. |
| 2021/0213319 A1 | 7/2021 | Hulbert et al. |
| 2021/0220687 A1 | 7/2021 | Hulbert et al. |
| 2021/0309830 A1 | 10/2021 | Hulbert et al. |
| 2022/0072355 A1 | 3/2022 | Hulbert et al. |
| 2022/0080242 A1 | 3/2022 | Hulbert et al. |
| 2022/0323809 A1 | 10/2022 | Hulbert et al. |
| 2023/0001250 A1 | 1/2023 | Hulbert et al. |

FOREIGN PATENT DOCUMENTS

| | | |
|---|---|---|
| CN | 1225344 A | 8/1999 |
| CN | 1446993 A | 10/2003 |
| CN | 102417196 A | 4/2012 |
| CN | 104277607 A | 1/2015 |
| CN | 105586527 A | 5/2016 |
| CN | 107880857 A | 4/2018 |
| CN | 110064159 A | 7/2019 |
| CN | 112391176 A | 2/2021 |
| FR | 2019890 A1 | 7/1970 |
| GB | 2561610 B | 8/2022 |
| KR | 20170037417 A | 4/2017 |
| RO | 101017 B1 | 3/1991 |
| WO | 2006132568 A2 | 12/2006 |
| WO | 2010059508 A1 | 5/2010 |
| WO | 2010077493 A1 | 7/2010 |
| WO | 2019163839 A1 | 8/2019 |
| WO | 2020247775 A2 | 12/2020 |
| WO | 2020247780 A1 | 12/2020 |
| WO | 2022132962 A1 | 6/2022 |

OTHER PUBLICATIONS

U.S. Appl. No. 17/215,091, filed Mar. 29, 2021, Hulbert et al.
U.S. Appl. No. 16/894,214, filed Jun. 5, 2020, Hulbert et al.
U.S. Appl. No. 17/105,019, filed Nov. 25, 2020, Hulbert et al.
U.S. Appl. No. 17/213,770, filed Mar. 26, 2021, Hulbert et al.
U.S. Appl. No. 17/213,780, filed Mar. 26, 2021, Hulbert et al.
U.S. Appl. No. 17/531,269, filed Nov. 19, 2021, Hulbert et al.
U.S. Appl. No. 17/031,024, filed Sep. 24, 2020, Hulbert et al.
U.S. Appl. No. 17/349,336, filed Jun. 16, 2021, Hulbert et al.
U.S. Appl. No. 17/214,266, filed Mar. 26, 2021, Hulbert et al.
U.S. Appl. No. 17/531,295, filed Nov. 19, 2021, Hulbert et al.
U.S. Appl. No. 17/458,002, filed Aug. 26, 2021, Hulbert et al.
U.S. Appl. No. 17/845,569, filed Jun. 21, 2022, Hulbert et al.
U.S. Appl. No. 17/552,196, filed Dec. 15, 2021, Hulbert et al.
Águeda Costafreda, Effects of long-term forest fire retardants on fire intensity, heat of combustion of the fuel and flame emissivity. Universitat Politècnica de Catalunya, 2009. 239 pages.
Blakely, "Laboratory method for evaluating forest fire retardant chemicals." (1970). 150 pages.
Byrd et al., "Characterizing short-wave infrared fluorescence of conventional near-infrared fluorophores." Journal of biomedical optics 24.3 (2019): 035004. 6 pages.
Cellulose. Wikipedia Dec. 6, 2018. Accessed at https://en.wikipedia.org/w/index.php?title=Cellulose&oldid=872356598 on Aug. 19, 2020. 12 pages.
Ding et al., "Recent advances in near-infrared II fluorophores for multifunctional biomedical imaging." Chemical science 9.19 (2018): 4370-4380.
Ecological Risk Assessment of Wildland Fire-Fighting Chemicals: Long-Term Fire Retardants. United States Forest Service Sep. 2017. Accessed at https://www.fs.fed.us/rm/fire/wfcs/documents/EcoRA-Retardants-ExecSummary_2017.pdf. 3 pages.

(56) References Cited

OTHER PUBLICATIONS

Evaluation of Wildland Fire Chemicals Standard Test Procedures STP 1.5—Fish Toxicity. USFS May 7, 2007. Accessed at https://www.fs.fed.us/rm/fire/wfcs/tests/documents/stp_01_5.pdf. 2 pages.
Fischel, "Evaluation of selected deicers based on a review of the literature." The SeaCrest Group, Report No. CDOT-DTD-R-2001-15 (Oct. 2001). 170 pages.
Fish Toxicity. US Forest Service Revised Sep. 6, 2017. Accessed at https://www.fs.fed.us/rm/fire/wfcs/performance/documents/FishTox_Foam.pdf. 2 pages.
Fiss et al., "Mechanochemical phosphorylation of polymers and synthesis of flame-retardant cellulose nanocrystals." ACS Sustainable Chemistry & Engineering 7.8 (2019): 7951-7959.
Grevel et al., "Experimentally determined standard thermodynamic properties of synthetic $MgSO_4$—$4H_2O$ (starkeyite) and $MgSO_4$—$3H_2O$: A revised internally consistent thermodynamic data set for magnesium sulfate hydrates." Astrobiology 12.11 (2012): 1042-1054.
Grevel et al., "Internally consistent thermodynamic data for magnesium sulfate hydrates." Geochimica et Cosmochimica Acta 73.22 (2009): 6805-6815.
Hobbs, "Recent advances in bio-based flame retardant additives for synthetic polymeric materials." Polymers 11.2 (2019): 224. 31 pages.
Hollingbery et al., "The fire retardant behaviour of huntite and hydromagnesite—A review." Polymer degradation and stability 95.12 (2010): 2213-2225.
Huang et al., "Study on EPS thermal insulation mortar prepared by magnesium oxychloride cement." E3S Web of Conferences. vol. 198. EDP Sciences, 2020. 4 pages.
International Search Report and Written Opinion in International Patent Application No. PCT/US2020/036360 dated Nov. 30, 2020, 43 pages.
International Search Report and Written Opinion in International Patent Application No. PCT/US2020/036367 dated Sep. 9, 2020, 23 pages.
International Search Report and Written Opinion in PCT/US21/63598 dated Mar. 2, 2022 27 pages.
International Search Report in International Patent Application No. PCT/US2021/047726 dated Feb. 3, 2022, 21 pages.
Invitation to Pay Additional Fees, and where Applicable, Protest Fee in International Patent Application No. PCT/US2020/036360 dated Aug. 24, 2020, 6 pages.
Invitation to Pay Additional Fees, and where Applicable, Protest Fee in International Patent Application No. PCT/US2021/047726 dated Nov. 9, 2021, 4 pages.
Mostashari et al., "Thermal decomposition pathway of a cellulosic fabric impregnated by magnesium chloride hexahydrate as a flame-retardant." Journal of thermal analysis and calorimetry 93.2 (2008): 589-594.
Mostashari et al., "XRD characterization of the ashes from a burned cellulosic fabric impregnated with magnesium bromide hexahydrate as flame-retardant." Journal of thermal analysis and calorimetry 92.3 (2008): 845-849.
Non-Final Office Action in U.S. Appl. No. 16/894,231 dated Dec. 10, 2020, 10 pages.
Perimeter Solutions, "Myth vs. Reality: Understanding the Chemistry of Wildfire Suppression" (Jun. 17, 2021), available at https://www.perimeter-solutions.com/wildfire-suppression-webinar/. 30 pages.
Qu et al., "The synergism of $MgCO_3$ and $2ZnCO_3$—$3ZnO$—$4H_2O$ as flame retardants and smoke suppressants for flexible poly (vinyl chloride)(PVC)." e-Polymers 11.1 (2011). 9 pages.
Specification for Long Term Retardant, Wildland Fire, Aircraft or Ground Application. US Department of Agriculture Forest Service Specification 5100-304b. Jan. 2000. Accessed at https://www.fs.fed.us/rm/fire/documents/304_b.pdf. 24 pages.
Specification for Long Term Retardant, Wildland Firefighting. US Department of Agriculture Forest Service Specification 5100-304d. Jan. 7, 2020. Accessed at https://www.fs.fed.us/rm/fire/wfcs/documents/5100-304d_LTR_Final%20Draft_010720.pdf. 32 pages.
Specification for Long Term Retardant, Wildland Firefighting. US Department of Agriculture Forest Service Specification 5100-304c. Jun. 1, 2007. https://www.fs.fed.us/rm/fire/wfcs/documents/304c.pdf. 30 pages.
Walter et al., "Overview of flame retardants including magnesium hydroxide." Martin Marietta Magnesia Specialties (2015). 9 pages.
Wu et al., "Comparative performance of three magnesium compounds on thermal degradation behavior of red gum wood." Materials 7.2 (2014): 637-652.
Wu et al., "Flame retardancy and thermal degradation behavior of red gum wood treated with hydrate magnesium chloride." Journal of Industrial and Engineering Chemistry 20.5 (2014): 3536-3542.
Zhang et al., "Flame Retardancy of High-Density Polyethylene Composites with P, N-Doped Cellulose Fibrils." Polymers 12.2 (Feb. 5, 2020): 336. 15 pages.
Agueda et al. "Different scales for studying the effectiveness of long-term forest fire retardants." Progress in Energy and Combustion Science 34.6 (2008): 782-796.
Batista et al. Evaluation of the efficiency of a long-term retardant, based on ammonium polyphosphate, in controlled burns under laboratory conditions Assessment of efficiency of polyphosphate ammonium fire retardant, in control burnings under laboratory conditions Scientia Forestalis, vol. 36, Issue 79, 2008, p. 223-229.
Cavdar et al. "Ammonium zeolite and ammonium phosphate applied as fire retardants for microcrystalline cellulose filled thermoplastic composites." Fire Safety Journal 107 (2019): 202-209.
Di Blasi et al. "Effects of diammonium phosphate on the yields and composition of products from wood pyrolysis." Industrial & engineering chemistry research 46.2 (2007): 430-438.
Di Blasi et al. "Thermal and catalytic decomposition of wood impregnated with sulfur-and phosphorus-containing ammonium salts." Polymer Degradation and Stability 93.2 (2008): 335-346.
Gimenez et al. "Long-term forest fire retardants: a review of quality, effectiveness, application and environmental considerations." International Journal of Wildland Fire 13.1 (2004): 1-15.
Jin et al. "Flame retardant properties of laminated bamboo lumber treated with monoammonium phosphate (MAP) and boric acid/borax (SBX) compounds." BioResources 12.3 (2017): 5071-5085.
Liodakis et al. "Evaluating the use of minerals as forest fire retardants." Fire Safety Journal 45.2 (2010): 98-105.
Liodakis et al. "The effect of $(NH_4)_2HPO_4$ and $(NH_4)_2SO_4$ on the spontaneous ignition properties of Pinus halepensis pine needles." Fire safety journal 37.5 (2002): 481-494.
Van Der Veen et al. "Phosphorus flame retardants: properties, production, environmental occurrence, toxicity and analysis." Chemosphere 88.10 (2012): 1119-1153.
U.S. Appl. No. 18/060,943, filed Dec. 1, 2022, Hulbert et al.
U.S. Appl. No. 18/061,542, filed Dec. 5, 2022, Hulbert et al.
U.S. Appl. No. 18/060,941, filed Dec. 1, 2022, Hulbert et al.
U.S. Appl. No. 18/060,946, filed Dec. 1, 2022, Hulbert et al.

* cited by examiner

LONG-TERM FIRE RETARDANT WITH CORROSION INHIBITORS AND METHODS FOR MAKING AND USING SAME

CROSS-REFERENCE TO RELATED APPLICATIONS

This application is a continuation of U.S. application Ser. No. 17/552,196, filed Dec. 15, 2021, which is hereby incorporated by reference in its entirety. U.S. application Ser. No. 17/552,196 claims a priority benefit to U.S. provisional application Ser. No. 63/125,693 filed on Dec. 15, 2020, and 63/140,657 filed on Jan. 22, 2021, which are incorporated herein by reference in their entireties.

Incorporated herein by reference in their entirety are: U.S. provisional application Ser. No. 62/858,640 filed on Jun. 7, 2019; 62/989,350 filed on Mar. 13, 2020; and 63/024,040 filed on May 13, 2020.

BACKGROUND

Long-term retardants contain retardant salts that alter the way a forest fire burns, decrease the fire intensity, and slow the advance of the forest fire. Long-term retardants may be available as wet or dry concentrates that are mixed with water thereby improving water's effectiveness and ability to cling to fuels, over a long period of time. Long-term retardants may be colored with iron oxide, fugitive pigments, or remain uncolored.

In the "Ecological Risk Assessment of Wildland Fire-Fighting Chemicals: Long-Term Fire Retardants" (September 2017), hereby incorporated by reference in its entirety, the United States Forest Service ("USFS") has established a chemical toxicity risk assessment for fire-fighting chemicals currently approved for use by the USFS. The USFS uses a variety of fire-fighting chemicals to aid in the suppression of fire in wildlands. These products can be categorized as long-term retardants, foams, and water enhancers. This chemical toxicity risk assessment of the long-term retardants examines their potential impacts on terrestrial wildlife, plant, and aquatic species.

Further, in Specification 5100-304d (Jan. 7, 2020), Superseding Specification 5100-304c (June 2007), Superseding Specification 5100-304b (July 1999), Superseding Specification 5100-00304a (February 1986), entitled "Specification for Long Term Retardant, Wildland Fire, Aircraft or Ground Application," hereby incorporated by reference in its entirety, the United States Department of Agriculture ("USDA") Forest Service has established the maximum allowable corrosion rates for 2024T3 aluminum, 4130 steel, yellow brass and Az-31-B magnesium. The corrosivity of forest fire retardants, in concentrate, to aluminum, steel, yellow brass and magnesium must not exceed 5.0 milli-inches ("mils") per year as determined by the "Uniform Corrosion" test set forth in Section 4.3.5.1 of the USDA Forest Service Specifications. The Forest Service Specifications identify the maximum amount of corrosion acceptable when both the retardant concentrate and its diluted solutions are exposed to each metal indicated above at temperatures of 70° Fahrenheit ("F") and 120° F. in both totally and partially immersed configurations. The maximum allowable corrosivity of aerially applied fire-retardant diluted solutions to aluminum is 2.0 mils per year ("mpy") and the maximum corrosivity to brass and steel is 2.0 mpy when partially immersed and 5.0 when tested in the partially immersed condition. In the partially immersed configurations, one-half of the coupon is within the solution and one-half is exposed to the vapors in the air space over the solution.

U.S. Pat. No. 10,550,483 to Khosla et al. discloses "fire-retardant concentrate compositions comprising a mixture of ammonium phosphates" wherein "the mixture of ammonium phosphates has a molar ratio of ammoniacal nitrogen to phosphorus (N/P molar ratio) in a range of from about 1.1 to about 1.9." (2:7-13.) Khosla et al. is limited to this outer range of N/P molar ratios of about 1.1 to about 1.9, and values within this range, because all its examples (Examples 1-5) are limited to mixtures of monoammonium phosphate (MAP) and diammonium phosphate (DAP). Such mixtures of MAP and DAP, by definition, exclude any N/P molar ratio below about 1.1 (e.g., where N/P=1 for MAP alone) or above about 1.9 (e.g., where N/P=2 for DAP alone). Moreover, it was explained during prosecution of Khosla et al. that "Applicants have discovered that controlling the N/P molar ratio within the claimed range of from 1.4 to about 1.9 for mixture of ammonium phosphate fire-retardants provides the required magnesium alloy corrosion rate." (Applicant's Response at p. 9, filed on Sep. 18, 2019, in U.S. Ser. No. 15/670,422.)

In contrast to Khosla et al.'s reliance on controlling N/P molar ratios within a particular range, the present inventors have discovered that fire retardants salts containing both ammonium and phosphate with an N/P ratio of less than about 1.1 or greater than about 1.9 can exhibit low aquatic toxicity and low corrosion rates.

SUMMARY

The invention relates generally to fire retardant compositions and more particularly to long-term fire retardants suitable for use in direct or indirect attack of forest fires.

In one embodiment, a forest fire retardant concentrate includes a retardant compound, a corrosion inhibitor, a strong acid or weak acid, a thickening agent, and optionally a colorant. The retardant compound is at least one of diammonium phosphate, diammonium orthophosphate, monoammonium phosphate, monoammonium orthophosphate, monosodium phosphate, disodium phosphate, disodium phosphate hydrate, sodium ammonium phosphate, sodium ammonium phosphate hydrate, sodium tripolyphosphate, trisodium phosphate, or dipotassium phosphate. The corrosion inhibitor may include a corrosion inhibitor for at least one of iron, brass, aluminum, or magnesium.

In another embodiment, the fire retardant concentrate includes a retardant compound including at least one of diammonium phosphate, diammonium orthophosphate, disodium phosphate, disodium phosphate hydrate, sodium tripolyphosphate, or trisodium phosphate; a corrosion inhibitor for at least one of iron, brass, aluminum, or magnesium present in the concentrate in an amount having a weight percent of about 0.1% to about 3.0% relative to total weight of the concentrate; a strong acid or weak acid; a thickening agent, present in the concentrate in an amount having a weight percent of about 0.75% to about 5.0% relative to total weight of the concentrate; optionally a colorant, present in the concentrate in an amount having a weight percent of about 0.04% to about 6.0% relative to total weight of the concentrate. The forest fire retardant concentrate has a molar ratio of ammoniacal nitrogen to phosphorus (N/P molar ratio) of less than about 1.1 or greater than about 1.9. In another embodiment, the fire retardant concentrate includes not more than two ammonium phosphates and at least one of monosodium phosphate or disodium phosphate. In another embodiment, the fire retardant concentrate includes not more than one ammonium phosphate. In another embodiment, the fire retardant concentrate includes diammonium phosphate, and the strong acid or weak acid comprises at least one of citric acid or monosodium phosphate. The forest fire retardant composition may be in the form of a dry concentrate.

In another embodiment, the fire retardant concentrate includes a retardant compound including at least one of monoammonium phosphate, monoammonium orthophosphate, monosodium phosphate, sodium ammonium phosphate, or sodium ammonium phosphate hydrate; a corrosion inhibitor for at least one of iron, brass, aluminum, or magnesium present in the concentrate in an amount having a weight percent of about 0.1% to about 3.0% relative to total weight of the concentrate; a strong base or weak base; a thickening agent, present in the concentrate in an amount having a weight percent of about 0.75% to about 5.0% relative to total weight of the concentrate; optionally a colorant, present in the concentrate in an amount having a weight percent of about 0.04% to about 6.0% relative to total weight of the concentrate. The forest fire retardant concentrate has a molar ratio of ammoniacal nitrogen to phosphorus (N/P molar ratio) of less than about 1.1 or greater than about 1.9. In another embodiment, the fire retardant concentrate includes monoammonium phosphate and diammonium phosphate and the strong acid or weak acid comprises disodium phosphate. In another embodiment, the fire retardant concentrate includes not more than two ammonium phosphates and at least one of monosodium phosphate or disodium phosphate. In another embodiment, the fire retardant concentrate includes not more than one ammonium phosphate.

In another embodiment, a forest fire retardant final diluted product includes a retardant compound including a phosphate salt. The phosphate salt includes at least one of diammonium phosphate, diammonium orthophosphate, monoammonium phosphate, monoammonium orthophosphate, monosodium phosphate, disodium phosphate, disodium phosphate hydrate, sodium ammonium phosphate, sodium ammonium phosphate hydrate, sodium tripolyphosphate, trisodium phosphate, or dipotassium phosphate. The retardant compound is present in the forest fire retardant final diluted product in an amount having a weight percent of about 6% to about 20% relative to the total weight of the final diluted product. In another embodiment, the forest fire retardant final diluted product includes not more than one ammonium phosphate. In another embodiment, the forest fire retardant final diluted product includes at least one of diammonium phosphate or monoammonium phosphate and at least one of disodium phosphate, monosodium phosphate, or dipotassium phosphate. The pH of the forest fire retardant final diluted product is about 6.0 to about 6.5. The forest fire retardant final diluted product has a molar ratio of ammoniacal nitrogen to phosphorus (N/P molar ratio) of less than about 1.1.

In another embodiment, the forest fire retardant final diluted product includes a phosphate salt; a corrosion inhibitor for at least one of iron, brass, aluminum, or magnesium present in the composition in an amount having a weight percent of about 0.1% to about 3.0% relative to the total weight of the final diluted product; a buffering agent present in the composition in an amount having a weight percent of about 7% to about 56% relative to the total weight of the final diluted product; a thickening agent, present in the composition in an amount having a weight percent of about 0.75% to about 5.0% relative to the total weight of the final diluted product; optionally a colorant, present in the composition in an amount having a weight percent of about 0.04% to about 6.0% relative to the total weight of the final diluted product. The forest fire retardant may be in the form of a final diluted product is intended for use to suppress, retard, or contain forest fires.

In another embodiment, the forest fire retardant concentrate that is used to produce the final diluted product does not include ammonium phosphate. In another embodiment, the forest fire retardant concentrate used to prepare the final diluted product includes an ammonium source. The ammonium source may include at least one of ammonium chloride, ammonium acetate, ammonium citrate, or ammonium sulfate.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

In General

Figure 1:
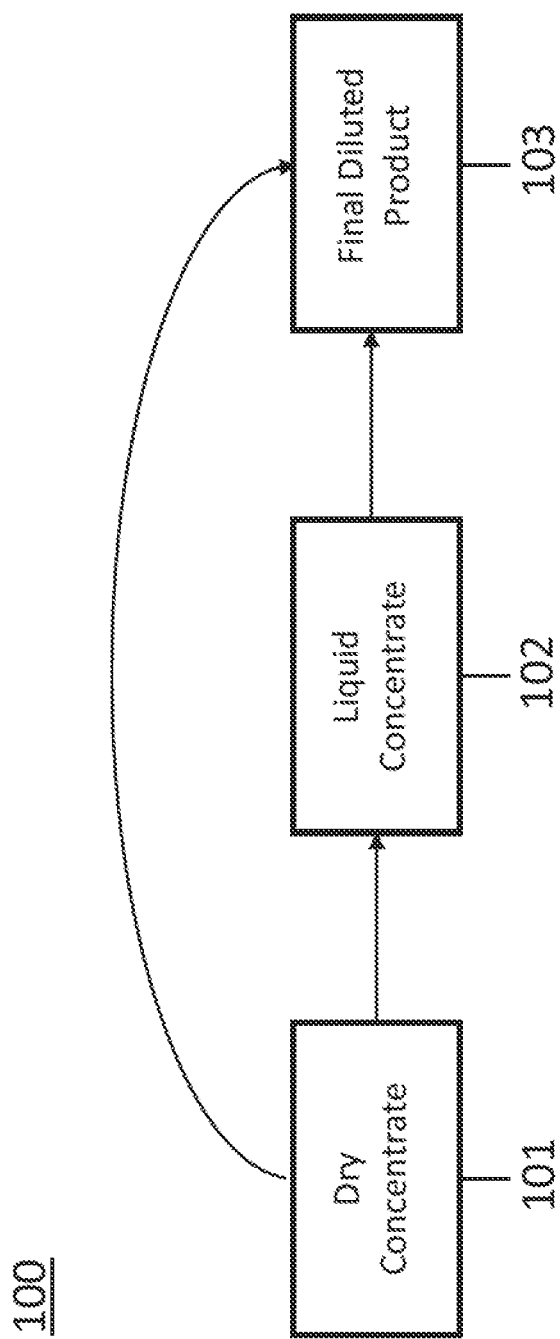
FIG. 1 is a flow chart diagram showing the process of making a forest fire retardant composition from a dry concentrate.

Referring to FIG. 1, a forest fire retardant composition 100 can be provided in various forms. The composition 100 can be provided as a dry concentrate 101 substantially free of water. Alternatively, the composition 100 can be provided as a liquid concentrate 102. The liquid concentrate 102 can be formed by adding water or other solvent(s) to the dry concentrate 101. Alternatively, liquid concentrate 102 is formed when the dry concentrate 101 is deliquescent, hygroscopic, and absorbs moisture from the air or other moisture source. The composition 100 can also be provided as a final diluted product 103 in a form suitable to fight forest fires via aerial- or ground-based application. The final diluted product 103 is formed either by diluting the dry concentrate 101 with water or by diluting the liquid concentrate 102 with water.

Figure 2:
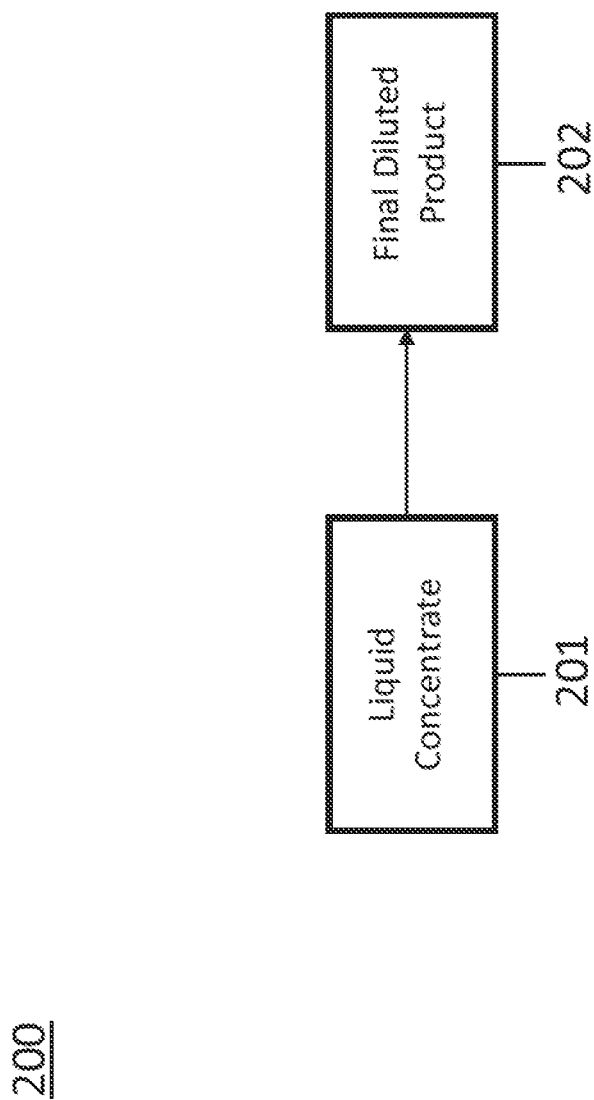
FIG. 2 is a flow chart diagram showing the process of making a forest fire retardant composition from a liquid concentrate.

Referring to FIG. 2, a forest fire retardant composition 200 can be provided in various liquid forms. The composition 200 can be provided as a liquid concentrate 201. The composition 200 can also be provided as a final diluted product 202 in a form suitable to fight forest fires via aerial- or ground-based application. The final diluted product 202 is formed by diluting the liquid concentrate 201 with water in one or more diluting steps.

Components of the Concentrates 100 and 200

The forest fire retardant compositions 100 and 200 include one or more retardant compounds. The retardant compounds are preferably inorganic compounds. Instead of (or in addition to) inorganic compounds, the retardant compounds may be an organic compound. Table 1 below illustrates exemplary inorganic compounds, any one or more of which may be used, alone or in combination, as a retardant compound in the compositions 100 and 200.

TABLE 1

Exemplary Retardant Compounds

| Halide Salts | Non-Halide Salts | Other inorganic retardants | Organic retardants |
|---|---|---|---|
| $MgCl_2$ | $MgCO_3$ | $MgO$ | $C_2H_7NO_2$ |
| $MgCl_2(H_2O)_x$ where $x$ is 1, 2, 4, 6, 8, or 12 | $Mg_3(PO_4)_2$ | $CaO$ | $C_6H_{11}NO_7$ |
| $CaCl_2$ | $Mg_5(CO_3)_4(OH)_2(H_2O)_4$ | $Na_2O$ | |
| $CaCl_2(H_2O)_x$ where $x$ is 1, 2, 4, or 6 | $Mg_3(PO_4)_2(H_2O)_8$ | $Li_2O$ | |
| $MgBr_2$ | $CaCO_3$ | $BaO$ | |
| $CaBr_2$ | $Ca_3(PO_4)_2$ | $Mg(OH)_2$ | |
| $NH_4Cl$ | $Mg_3Ca(CO_3)_4$ | $Ca(OH)_2$ | |
| | $Ca_3(PO_4)_2(H_2O)_2$ | $NaOH$ | |
| | DAP | $LiOH$ | |
| | MAP | $Ba(OH)_2$ | |
| | APP | $KOH$ | |
| | $(NH_4)_2SO_4$ | $P_2O_5$ | |
| | $K_2SO_4$ | | |
| | $MgSO_4$ | | |
| | $MgSO_4(H_2O)_x$ where $x$ is 1, 2, 3, 4, 5, 6, 7, 9, 10 or 11 | | |
| | $K_2Mg(SO_4)_2(H_2O)_x$ where $x$ is 4 or 6 | | |
| | $Na_2SO_4$ | | |
| | $Na_2SO_4(H_2O)_x$ where $x$ is 7 or 10 | | |
| | $MgCO_3(H_2O)_x$ where $x$ is 2, 3, or 5 | | |
| | $Mg(PO_4HNH_4)_2$ | | |
| | $NaPO_4HNH_4$ | | |
| | $NaPO_4HNH_4(H_2O)_x$, where $x = 1, 2, 3,$ or $4$ | | |
| | $Na_2HPO_4$ | | |
| | $Na_2HPO_4(H_2O)_x$, where $x = 2, 7, 8,$ or $12$ | | |
| | $NaH_2PO_4$ | | |
| | $NaH_2PO_4(H_2O)_x$, where $x = 1$ or $2$ | | |
| | $Na_3PO_4$ | | |
| | $Na_5P_3O_{10}$ | | |
| | $Na_5P_3O_{10}(H_2O)_6$ | | |
| | $Ca(H_2PO_4)_2$ | | |
| | $Ca(H_2PO_4)_2(H_2O)_x$, where $x = 1$ | | |
| | $CaHPO_4$ | | |
| | $CaHPO_4(H_2O)_x$, where $x = 1$ or $2$ | | |
| | $Ca_3(PO_4)_2$ | | |
| | $Ca_8H_2(PO_4)_6 \cdot 5H_2O$ | | |
| | $Ca_2P_2O_7$ | | |
| | $Ca_2P_2O_7(H_2O)_x$, where $x = 2$ or $4$ | | |
| | $Ca_5(P_3O_{10})_2$ | | |
| | $Ca_5(PO_4)_3(OH)$ | | |
| | $Ca_{10}(PO_4)_6(OH, F, Cl, Br)_2$ | | |
| | $Ca_4(PO_4)_2 \cdot O$ | | |
| | $KH_2PO_4$ | | |
| | $K_2HPO_4$ | | |
| | $K_2HPO_4(H_2O)_x$, where $x = 3$ or $6$ | | |
| | $K_3PO_4$ | | |
| | $K_3PO_4(H_2O)_x$, where $x = 3, 7,$ or $9$ | | |

The retardant compound may be a salt. The salt may be a phosphate salt. Preferably the phosphate salt is a technical grade phosphate with low concentrations of heavy metals. The phosphate salt may include ammonium salts of ortho, pyro, tripoly, or tetrapoly phosphoric acid. The phosphate salt in the forest fire retardant composition 100 and/or 200 may include one or more of the following: ammonium orthophosphates, ammonium pyrophosphates, ammonium polyphosphates having an average chain length of less than 20 phosphorus atoms. For example, the phosphate salt may include at least one of diammonium phosphate (DAP), diammonium orthophosphate (DAP), monoammonium phosphate (MAP), monoammonium orthophosphate (MAP), ammonium polyphosphate (APP).

Instead of (or in addition to) ammonium salts of ortho, pyro, tripoly, or tetrapoly phosphoric acid, the phosphate salt may include a sodium phosphate salt. The sodium phosphate salt may include sodium salts of mono-, di-, tri-, tetra, and polyphosphates. The sodium phosphate salt in the forest fire retardant composition 100 and/or 200 may include one or more of the following: monosodium phosphate (MSP), disodium phosphate (DSP), disodium phosphate hydrate, sodium ammonium phosphate (SAP), sodium ammonium phosphate hydrate (SAP-H), sodium tripolyphosphate (STPP), trisodium phosphate (TSP), and mixtures thereof. The disodium phosphate can be anhydrous, substantially free of any hydrate. Alternatively, or in combination with the anhydrous disodium phosphate, the disodium phosphate can be a hydrate, substantially free of any anhydrous. The hydrate may have the formula $Na_2HPO_4(H_2O)_x$, where x is about 1 to about 12. For example, x may be equal to at least one of 2, 7, 8, or 12. The disodium phosphate may contain a mixture of multiple different hydrates $Na_2HPO_4(H_2O)_y$, such that when measured, y constitutes an average weighted number of hydrates in the mixture, and thus y is not necessarily a whole number. For example, the average weighted value of y may be about 2.0 to about 12.0, preferably about 1.5 to about 11.5, more preferably about 2.5 to about 10.5, and more preferably about 3.5 to about 9.5. The sodium ammonium phosphate can be anhydrous, substantially free of any hydrate. Alternatively, or in combination with the anhydrous sodium ammonium phosphate, the sodium ammonium phosphate can be a hydrate. The hydrate may have the formula $NaPO_4HNH_4(H_2O)_x$, where x is about 1 to about 4. For example, x may be equal to at least one of 1, 2, 3, or 4. The disodium phosphate may also contain a mixture of multiple different hydrates $NaPO_4HNH_4(H_2O)_y$, such that when measured, y constitutes an average weighted number of hydrates in the mixture, and thus y is not necessarily a whole number. For example, the average weighted value of y may be about 1.0 to about 4.0, preferably about 1.2 to about 3.9, more preferably about 1.4 to about 3.8, and more preferably about 1.6 to about 3.6. The sodium ammonium phosphate hydrate is preferably sodium ammonium phosphate tetrahydrate (SAP-TH) having the formula $NaPO_4HNH_4(H_2O)_4$.

Instead of (or in addition to) ammonium salts of ortho, pyro, tripoly, or tetrapoly phosphoric acid and/or sodium phosphate salt(s), the phosphate salt may be a calcium phosphate salt. The calcium phosphate salt may include calcium salts of orthophosphates, di- and monohydrogen phosphates, and/or di- and polyphosphates. The calcium phosphate salt in the forest fire retardant composition 100 and/or 200 may include one or more of the following: monocalcium phosphate (MCP), dicalcium phosphate (DCP), tricalcium phosphate (TCP), octacalcium phosphate (OCP), dicalcium diphosphate, calcium triphosphate, hydroxyapatite, Apatite, or tetracalcium phosphate (TTCP).

Instead of (or in addition to) ammonium salts of ortho, pyro, tripoly, or tetrapoly phosphoric acid, sodium phosphate salt(s), and/or calcium phosphate salts, the phosphate salt may be a potassium phosphate salt. The potassium phosphate salt in the forest fire retardant composition 100 and/or 200 may include one or more of the following: monopotassium phosphate (MKP), dipotassium phosphate, or tripotassium phosphate.

The phosphate salt of the forest fire retardant composition 100 and/or 200 may include an ammonium source. The ammonium source may be an ammonium salt. The ammonium source may be an ammonium phosphate salt. For example, when the phosphate salt includes ammonium. The ammonium phosphate salt in the forest fire retardant composition 100 and/or 200 may include one or more of the following: diammonium phosphate (DAP), diammonium orthophosphate (DAP), monoammonium phosphate (MAP), monoammonium orthophosphate (MAP), ammonium polyphosphate (APP), sodium ammonium phosphate (SAP), or sodium ammonium phosphate hydrate (SAP-H). Instead of (or in addition to) an ammonium phosphate salt, the forest fire retardant composition 100 and/or 200 may include a non-phosphate ammonium source. The non-phosphate ammonium source in the forest fire retardant composition 100 and/or 200 may include one or more of the following: ammonium chloride, ammonium acetate, ammonium citrate, or ammonium sulfate. The forest fire retardant concentrate 101 and/or 201 may contain no ammonium phosphate, but when the forest fire retardant concentrate 101 and/or 201 is diluted with water to make the final diluted product 103 and/or 202, the final diluted product 103 and/or 202 may contain ammonium phosphates due to the exchange of ions in solution. The forest fire retardant composition 100 and/or 200 may contain a mixture of phosphates.

In certain embodiments, the mixture of phosphates has a molar ratio of ammoniacal nitrogen to phosphorus (N/P molar ratio) of about 0.4 to about 1.4, preferably about 0.6 to about 1.3, more preferably about 0.8 to about 1.1. For example, the N/P molar ratio is less than about 1.1, or is about 1. For example, the N/P molar ratio may be below 1.05, below 1.04, below 1.03, below 1.02, below 1.01, or below 1.00. In another embodiment, the N/P molar ratio is greater than about 1.9, for example about 1.9 to about 3.0, preferably about 2.0 to about 2.9, more preferably about 2.1 to about 2.7. For example, the N/P molar ratio may be above 1.95, above 1.96, above 1.97, above 1.98, above 1.99, or above 2.0. As used herein, "ammoniacal nitrogen," when referring to the nitrogen to phosphorus molar ratio (N/P molar ratio) refers to any ammoniacal nitrogen ($NH_4^+$) or phosphorus present in the formulation from any of the sources listed in Table 1. For example, the N/P ratio would not include any nitrogen or phosphorus from a dye not listed in Table 1.

Referring to FIG. 1, the composition 100 may begin as a dry concentrate 101 substantially free of water. As used herein, "substantially free of water," when referring to the dry concentrate 101, does not refer to the water of crystallization or water of hydration of the phosphate salt (i.e., the hydrate phosphate salt). Additionally, as used herein, "substantially free of water," when referring to the dry concentrate 101, does not prohibit the addition of minimal amounts of water (e.g., less than 2% weight percent relative to the amount of the retardant compound in the composition 100) to the dry concentrate 101 to assist with mixing the components.

In the dry concentrate 101, the weight percent of the retardant compound relative to the total weight of the dry concentrate 101 is about 60% to about 99.5%, preferably about 62% to about 99%, more preferably about 64% to about 98.5%, and particularly about 66% to about 98%.

In the final diluted product 103, the weight percent of the retardant compound relative to the total weight of the final diluted product 103 is about 4% to about 30%, preferably about 6% to about 28%, more preferably about 7% to about 26%, and particularly about 8% to about 24%.

In the liquid concentrate 201, the weight percent of the retardant compound relative to the total weight of the liquid concentrate 201 is about 30% to about 80%, preferably about 32% to about 75%, more preferably about 36% to about 70%, and particularly about 38% to about 65%.

In the final diluted product 202, the weight percent of the retardant compound relative to the total weight of the final diluted product 202 is about 4% to about 30%, preferably about 5% to about 28%, more preferably about 6% to about 26%, and particularly about 7% to about 24%.

The forest fire retardant composition 100 and/or 200 may further include a corrosion inhibitor. The corrosion inhibitor may include an inhibitor for brass, iron, aluminum, steel, copper, and/or magnesium. The corrosion inhibitor may also include an inhibitor for any of the compounds listed in Table 1. The corrosion inhibitor for magnesium may include any corrosion inhibitors disclosed in Lamaka, S. V., et al. "Comprehensive screening of Mg corrosion inhibitors." *Corrosion Science* 128 (2017), hereby incorporated by reference in its entirety. The corrosion inhibitor may include an alkyl (such as an alkyl amine) and one or more azoles. The corrosion inhibitor may include COBRATEC 928, Denatonium benzoate, benzoic acid, diammonium phosphate, monoammonium phosphate, Wintrol SB 25Na, or a combination of the above. The corrosion inhibitor may include one or more azoles. The corrosion inhibitor may be a Wintrol® Super Azole Mix (Wintrol® SAM-H90 from Wincom, Inc). The Wintrol® SAM-H90 is designed for aqueous application. Wintrol® SAM-H90 provides corrosion resistance in highly corrosive environments caused by halogens, such chloride. Optionally, Wintrol® SAM-H38Na may be used as the corrosion inhibitor, alone or in combination with Wintrol® SAM-H90. The corrosion inhibitor may include but is not limited to, sodium selenite, sodium stearate, sodium benzoate, sodium fluoride, sodium phosphate, sodium fumarate dibasic, magnesium phosphate, benzotriazole derivatives, sodium salts of benzotriazole derivatives, aqueous mixtures of benzotriazole derivatives, benzotriazole-5-carboxcylic acid, benzotriazole, butyl benzotriazole, sodium butyl benzotriazole, tolytriazole derivatives, sodium salts of tolytriazole derivatives, aqueous mixtures of tolytriazole derivatives, tetrathydro tolytriazole, tolytriazole, hydrogenated tolyltriazole and mixtures thereof, sodium tolytriazole, sodium tolytriazole (50% solution), 3-hydroxyphenyl-4-phenyl-5-mercapto-1,2,4-triazole (HPMT), 3-aminophenyl-4-phenyl-5-mercapto-1,2,4-triazole (APMT), 3,4-diphenyl-5-mercapto-1,2,4-triazole (DPMT), 3-cinnamyl-4-phenyl-5-mercapto-1,2,4-triazole (CPMT), 1,8-napthalaldehydic acid, octadecylphosphonic acid, sodium dodecyl sulfonate (SDBS), Wintrol® BBT-25Na, Wintrol® BBT, Wintrol® THT-T, Wintrol® THT-35PG, Wintrol® THT-50K, Wintrol® SAM-H90, Wintrol SB 25Na, Wintrol® SAM-H38Na, Wintrol® SAM-H40(OS), Wintrol® SAM-B90, berberine, pyrrolidine benzylic, catechin, lysergic acid, carmine, fast green, aniline, vanillin, triethanolamine, low freeze grade triethanolamine (85% TEA and 15% water), p-chloroaniline, p-nitroaniline, p-methoxyaniline, p-methylaniline, p-cumate Na, sodium silicate, sodium molybdate, sodium molybdate dihydrate, disodium molbdate, disodium molybdate dihydrate, a biopolymer (such as rhamsan gum, xanthan gum, diutan gum, or welan gum), sodium silicofluoride (SSF), and dimercaptothiadiazole (DMTD), or a combination of the above.

In the dry concentrate 101, the weight percent of the corrosion inhibitor (excluding any water in the corrosion inhibitor) relative to the total weight of the dry concentrate 101 is about 0.025% to about 4.0%, preferably about 0.05% to about 3.5%, more preferably about 0.1% to about 3.0%, and particularly about 0.15% to about 2.5%.

In the final diluted product 103, the weight percent of the corrosion inhibitor (excluding any water in the corrosion inhibitor) relative to the total weight of the final diluted product 103 is about 0.01% to about 3.0%, preferably about 0.015% to about 2.5%, more preferably about 0.02% to about 2.0%, and particularly about 0.025% to about 1.5%.

In the liquid concentrate 201, the weight percent of the corrosion inhibitor (excluding any water in the corrosion inhibitor) relative to the total weight of the liquid concentrate 201 is about 0.025% to about 4.0%, preferably about 0.05% to about 3.5%, more preferably about 0.1% to about 3.0%, and particularly about 0.15% to about 2.5%.

In the final diluted product 202, the weight percent of the corrosion inhibitor (excluding any water in the corrosion inhibitor) relative to the total weight of the final diluted product 202 is about 0.01% to about 3.0%, preferably about 0.015% to about 2.5%, more preferably about 0.02% to about 2.0%, and particularly about 0.025% to about 1.5%.

To control the viscosity of the composition 100 and/or 200, the composition 100 and/or 200 may also include at least one thickening agent. The thickening agent may be a polyurethane, a polyvinyl alcohol, an acrylic polymer, a gum, a cellulosic, a sulfonate, a saccharide, a clay, an organosilicone, or a protein, including but not limited to latex, styrene, butadiene, polyvinyl alcohol, attapulgite, bentonite, montmorillonite, algin, collagen, casein, albumin, castor oil, cornstarch, arrowroot, yuca starch, carrageenan, pullulan, konjac, alginate, gelatin, agar, pectin, carrageenan, chitosan, xanthan gum, guar gum, rhamsan gum, diutan gum, welan gum, cellulose gum, acacia guar gum, locust bean gum, acacia gum, gum tragacanth, glucomannan polysaccharide gum, alginic acid, sodium alginate, potassium alginate, ammonium alginate, calcium alginate, carboxymethyl cellulose (CMC), methyl cellulose, hydroxyethyl cellulose (HEC), hydroxymethyl cellulose (HMC), hydroxypropyl methylcellulose (HPMC), ethylhydroxymethyl cellulose, hypromellose (INN), cetyl alcohol, cetearyl alcohol, polyethylene glycol (PEG), monoethylene glycol, acrylic microgel, or acrylic amide wax. A combination of thickeners may provide a similar viscosity profile of the composition 100 and/or 200 with a varying weight percent of the thickening agent(s). For example, two or more of the above viscosity modifiers may be combined to provide a low viscosity (e.g., 150-400 cP), or a medium viscosity (e.g., 401-800 cP), or a high viscosity (e.g., 801-1500 cP).

In the dry concentrate 101, the weight percent of the thickening agent relative to the total weight of the dry concentrate 101 is about 0.25% to about 6.0%, preferably about 0.5% to about 5.5%, more preferably about 0.75% to about 5.0%, and particularly about 1.0% to about 4.5%.

In the final diluted product 103, the weight percent of the thickening agent relative to the total weight of the final diluted product 103 is about 0.0125% to about 5.5%, preferably about 0.025% to about 5.0%, more preferably about 0.75% to about 4.5%, and particularly about 0.1% to about 4.0%.

In the liquid concentrate 201, the weight percent of the thickening agent relative to the total weight of the liquid concentrate 201 is about 0.25% to about 6.0%, preferably about 0.5% to about 5.5%, more preferably about 0.75% to about 5.0%, and particularly about 1.0% to about 4.5%.

In the final diluted product 202, the weight percent of the thickening agent relative to the total weight of the final diluted product 202 is about 0.0125% to about 5.0%, preferably about 0.025% to about 4.5%, more preferably about 0.05% to about 4.0%, and particularly about 0.1% to about 3.5%.

To control the pH of the composition 100 and/or 200, the composition 100 and/or 200 may also include buffering agents such as organic amines including but not limited to triethanolamine ($C_6H_{15}NO_3$), low freeze grade triethanolamine (85% TEA and 15% water), diethanolamine, monoethanolamine, tris(hydroxymethyl)aminomethane, ethylenediamine tetraacetic acid, ethylene diamine, piperidine, pyrrolidine, DABCO, N-methyl pyrrolidine, N-methylpyrrolidone, quinuclidine, diisoropryopylamine, diisopropylmethylamine, methyl piperidine, N-[tris(hydroxymethyl) methyl]glycine, 3-dimethylamino-1-propanol, or 3-(diethylamino)-1,2, propanediol. The buffering agent may include one or more of the phosphate salts disclosed herein. The buffering agent may also be a strong acid, a weak acid, a strong base, or a weak base.

In the dry concentrate 101, the weight percent of the buffering agent relative to the total weight of the dry concentrate 101 is about 1% to about 60%, preferably about 2% to about 58%, more preferably about 3% to about 56%, and particularly about 4% to about 54%.

In the final diluted product 103, the weight percent of the buffering agent relative to the total weight of the final diluted product 103 is about 0.1% to about 25%, preferably about 0.2% to about 20%, more preferably about 0.3% to about 18%, and particularly about 0.4% to about 16%.

In the liquid concentrate 201, the weight percent of the buffering agent relative to the total weight of the liquid concentrate 201 is about is about 5% to about 45%, preferably about 6% to about 40%, more preferably about 7% to about 35%, and particularly about 8% to about 30%.

In the final diluted product 202, the weight percent of the buffering agent relative to the total weight of the final diluted product 202 is about 0.5% to about 20%, preferably about 1% to about 18%, more preferably about 1.5% to about 16%, and particularly about 2% to about 14%.

The strong acid and/or weak acid may include but is not limited to monosodium phosphate (MSP), sodium bicarbonate, sodium bisulfate, monosodium dihydrogen orthophosphate, disodium hydrogen phosphate, potassium bisulfite, ammonium chloride, ammonium sulfate, sulfurous acid, sulfuric acid, hyposulfurous acid, persulfuric acid, pyrosulfuric acid, disulfurous acid, dithionous acid, tetrathionic acid, thiosulfurous acid, hydrosulfuric acid, peroxydisulfuric acid, perchloric acid, hydrochloric acid, hypochlorous acid, chlorous acid, chloric acid, hyponitrous acid, nitrous acid, nitric acid, pernitric acid, carbonous acid, carbonic acid, hypocarbonous acid, percarbonic acid, oxalic acid, acetic acid, pyrophosphoric acid, hydrophosphoric acid, hydrobromic acid, bromous acid, bromic acid, hypobromous acid, hypoiodous acid, iodous acid, iodic acid, periodic acid, hydroiodic acid, hydroselenic acid, selenic acid, selenous acid, hydronitric acid, boric acid, molybdic acid, perxenic acid, silicofluoric acid, telluric acid, tellurous acid, tungstic acid, xenic acid, citric acid, formic acid, pyroantimonic acid, antimonic acid, antimonous acid, silicic acid, titanic acid, arsenic acid, pertechnetic acid, hydroarsenic acid, tetraboric acid, metastannic acid, hypooxalous acid, silicous acid, uranic acid, diuranic acid, malonic acid, tartartic acid, glutamic acid, phthalic acid, azelaic acid, barbituric acid, benzilic acid, cinnamic acid, fumaric acid, glutaric acid, gluconic acid, hexanoic acid, lactic acid, malic acid, oleic acid, folic acid, propiolic acid, propionic acid, rosolic acid, stearic acid, tannic acid, trifluoroacetic acid, uric acid, ascorbic acid, gallic acid, acetylsalicylic acid, acetic acid, or an acidic organic amine.

In the dry concentrate 101, the weight percent of the strong acid and/or weak acid relative to the total weight of the dry concentrate 101 is about 1% to about 60%, preferably about 2% to about 58%, more preferably about 3% to about 56%, and particularly about 4% to about 54%.

In the final diluted product 103, the weight percent of the strong acid and/or weak acid relative to the total weight of the final diluted product 103 is about 0.1% to about 16%, preferably about 0.2% to about 14%, more preferably about 0.3% to about 12%, and particularly about 0.4% to about 10%.

In the liquid concentrate 201, the weight percent of the strong acid and/or weak acid relative to the total weight of the liquid concentrate 201 is about is about 5% to about 45%, preferably about 6% to about 40%, more preferably about 7% to about 35%, and particularly about 8% to about 30%.

In the final diluted product 202, the weight percent of the strong acid and/or weak acid relative to the total weight of the final diluted product 202 is about 0.5% to about 20%, preferably about 1% to about 18%, more preferably about 1.5% to about 16%, and particularly about 2% to about 14%.

The strong base and/or weak base may include but is not limited to disodium phosphate (DSP), disodium phosphate hydrate, dipotassium phosphate, sodium tripolyphosphate, trisodium phosphate, sodium carbonate, sodium bicarbonate, potassium carbonate, potassium bicarbonate, ammonium carbonate, ammonium bicarbonate, calcium carbonate, sodium acetate, trisodium citrate, trisodium phosphate, tripotassium phosphate, diammonium citrate, sodium borate, sodium N-Cyclohexyl-2-aminoethanesulfonate, sodium 4-(2-hydroxyethyl)-1-piperazineethanesulfonate, sodium N-(2-Acetamido)-2-aminoethanesulfonate, sodium N-cyclohexyl-3-aminopropanesulfonate, sodium 3-(N-morpholino)propanesulfonate, sodium 3-[4-(2-Hydroxyethyl) piperazin-1-yl]propane-1-sulfonate, sodium sulfide, zinc chloride hydroxide, magnesium oxychloride, aluminum hydroxide, bismuth oxychloride, beryllium hydroxide, boron hydroxide, calcium hydroxide, cesium hydroxide, cobalt(III) hydroxide, copper(II) hydroxide, gallium(III) hydroxide, gold(III) hydroxide, indium(II) hydroxide, iridium(III) hydroxide, iron(III) hydroxide, lithium hydroxide, molybdenum hydroxide, nickel oxo-hydroxide, nickel(III) hydroxide, osmium(IV) hydroxide, silver hydroxide, strontium hydroxide, technetium(II) hydroxide, thorium hydroxide, tin(IV) hydroxide, titanium(III) hydroxide, tungsten(II) hydroxide, yttrium hydroxide, zirconium hydroxide, ammonium hydroxide, barium hydroxide, bismuth(III) hydroxide, cerium(III) hydroxide, chromium(II) hydroxide, cobalt(II) hydroxide, copper(I) hydroxide, gallium(II) hydroxide, gold (I) hydroxide, indium(I) hydroxide, indium(III) hydroxide, iron(II) hydroxide, lanthanum hydroxide, magnesium hydroxide, neodymium hydroxide, nickel(II) hydroxide, niobium hydroxide, palladium(II) hydroxide, potassium hydroxide, sodium hydroxide, tantalum(V) hydroxide, tetramethylammonium hydroxide, thallium(III) hydroxide, tin(II) hydroxide, titanium(II) hydroxide, titanium(IV) hydroxide, uranyl hydroxide, vanadium(III) hydroxide, ytterbium hydroxide, zinc hydroxide, or a basic organic amine.

In the dry concentrate 101, the weight percent of the strong base and/or weak base relative to the total weight of the dry concentrate 101 is about 0.5% to about 20%, preferably about 0.75% to about 18%, more preferably about 1% to about 16%, and particularly about 1.25% to about 14%.

In the final diluted product 103, the weight percent of the strong base and/or weak base relative to the total weight of the final diluted product 103 is about 0.5% to about 25%, preferably about 1% to about 20%, more preferably about 1.5% to about 18%, and particularly about 2% to about 16%.

In the liquid concentrate 201, the weight percent of the strong base and/or weak base relative to the total weight of the liquid concentrate 201 is about is about 5% to about 35%, preferably about 6% to about 30%, more preferably about 7% to about 25%, and particularly about 8% to about 20%.

In the final diluted product 202, the weight percent of the strong base and/or weak base relative to the total weight of the final diluted product 202 is about 0.8% to about 16%, preferably about 1% to about 14%, more preferably about 1.2% to about 12%, and particularly about 1.4% to about 10%.

In one embodiment, the forest fire retardant composition 100 and/or 200 has a pH of about 5.0 to about 7.0, preferably about 5.2 to about 6.8, more preferably about 5.4 to about 6.6, and more preferably about 5.6 to about 6.4. For example, the pH of the forest fire retardant composition 100 and/or 200 may be about 5.6, about 5.7, about 5.8, about 5.9, about 6.0, about 6.1, about 6.2, about 6.3, about 6.4, or any value in between 5.6 and 6.4. In another embodiment, the forest fire retardant composition 100 and/or 200 has a pH of about 6.0 to about 8.0, preferably about 6.1 to about 7.9, more preferably about 6.2 to about 7.8. In another embodiment, the forest fire retardant composition 100 and/or 200 has a pH of about 7.0 to about 9.0, preferably about 7.2 to about 8.8, more preferably about 7.4 to about 8.6, and more preferably about 7.6 to about 8.4. For example, the pH of the forest fire retardant composition 100 and/or 200 may be about 7.6, about 7.7, about 7.8, about 7.9, about 8.0, about 8.1, about 8.2, about 8.3, about 8.4, or any value in between 7.6 and 8.4. For example, when the forest fire retardant composition 100 and/or 200 includes MAP and/or another acidic retardant salt, the pH of the composition is buffered by adding at least one strong base and/or weak base to achieve a pH of about 5.0 to about 7.0, preferably about 5.2 to about 6.8, more preferably about 5.4 to about 6.6, and more preferably about 5.6 to about 6.4. Alternatively, when the forest fire retardant composition 100 and/or 200 includes DAP and/or another basic retardant salt, the pH of the composition is buffered by adding at least one strong acid and/or weak acid to achieve a pH of about 7.0 to about 9.0, preferably about 7.2 to about 8.8, more preferably about 7.4 to about 8.6, and more preferably about 7.6 to about 8.4. Alternatively, when the forest fire retardant composition 100 and/or 200 includes both MAP and DAP, the pH of the composition is buffered by adding at least one strong base and/or weak base to achieve a pH of about 5.5 to about 7.5, preferably about 5.7 to about 7.3, more preferably about 6.0 to about 7.0, and more preferably about 6.1 to about 6.9. In one embodiment, when the forest fire retardant composition 100 and/or 200 includes both MAP and DAP, the pH of the composition may be buffered by one of more of the phosphate salts disclosed herein, for example disodium phosphate.

In one embodiment, the forest fire retardant composition 100 and/or 200 has an ionic molarity of about 1.0 to about 6.0, preferably about 1.2 to about 5.5, more preferably about 1.4 to about 5.0, more preferably about 1.6 to about 4.8. For example, the ionic molarity may be about 1.8 to about 4.6. As used herein, "ionic molarity" means a first order approximation of the ionic molarity of the retardant compound(s) and buffer(s) present in the composition 100 and/or 200. The first order approximation of the ionic molarity is the sum of the moles of expected ions in solution (i.e., the sum of the product of the moles of each retardant compound(s) and/or buffering agent and the expected ions/mol for each retardant compound(s) and/or buffer species in solution) divided by the solution volume in liters (L). Ions that are not from the retardant compound(s) or buffer are not considered. A sample first order approximation of the ionic molarity is show in in Equation 1 below:

$$1st\ \text{Order Approximation of Ionic Molarity} = \frac{\sum(((\text{ions}\ A/\text{mol}\ A)^*\text{mol}\ A) + ((\text{ions}\ B/\text{mol}\ B)^*\text{mol}\ B)...)}{vol\ (L)}$$

The composition 100 and/or 200 may also include surfactant components including but not limited to a sodium dodecyl sulfate (SDS), sodium lauryl sulfate (SLS), sodium 4-dodecylbenzenesulfonate (SDBS), modified silicones and emulsions thereof such as, a food grade foam control agent from Ivanhoe Industries Inc. including but not limited to a hydrophobic dispersion in oil (e.g., XFO-880, XFO-884, XFO-893, XFO-270, XFO-280, XFO-399, XFO-501AV, XFO-515B, XFO-809), a 10% active silicone emulsion (e.g., XFO-10S, XFO-220), a 30% active silicone emulsion (e.g., XFO-30S, XFO-225), a 100% active silicone compound (e.g., XFO-100S), a non-ionic surfactant (e.g., XFO-313, I-FLO 3K, I-FLO 6K), a non-ionic surfactant in oil (e.g., XFO-FG2), or a polyol blend (e.g., XFO-635D, XFO-645D, XFO-FD92), a food-grade, silicone emulsion from Dow Chemical (e.g., XIAMETER ACP-1920, XIAMETER AFE-1510, XIAMETER AFE-0010, XIAMETER AFE-1520, XIAMETER AFE-1530, XIAMETER AFE-0300, XIAMETER AFE-0100, XIAMETER ACP-1500), a food-grade, non-silicone defoamer, poloxamers, polyoxyethylene block copolymer surfactant (e.g., Pluronic® L101), fatty alcohols, zwitterionic surfactants, polyglycerol esters, sorbitan esters, lecithins, alkylammonium salts, alkyl phenol ethoxylates, or a combination of the above to reduce surface tension and increase the spreading and wetting properties of the forest fire retardant composition 100 and/or 200.

In the dry concentrate 101, the weight percent of the surfactant relative to the total weight of the dry concentrate 101 is about 0.01% to about 3.5%, preferably about 0.02% to about 3.0%, more preferably about 0.04% to about 2.5%, and particularly about 0.06% to about 2.0%.

In the final diluted product 103, the weight percent of the surfactant relative to the total weight of the final diluted product 103 is about 0.006% to about 2.0%, preferably about 0.008% to about 1.8%, more preferably about 0.01% to about 1.6%, and particularly about 0.012% to about 1.4%.

In the liquid concentrate 201, the weight percent of the surfactant relative to the total weight of the liquid concentrate 201 is about 0.01% to about 3.5%, preferably about 0.02% to about 3.0%, more preferably about 0.04% to about 2.5%, and particularly about 0.06% to about 2.0%.

In the final diluted product 202, the weight percent of the surfactant relative to the total weight of the final diluted product 202 is about 0.006% to about 2.0%, preferably about 0.008% to about 1.8%, more preferably about 0.01% to about 1.6%, and particularly about 0.012% to about 1.4%.

The composition 100 and/or 200 may also include adjuvants including but not limited to triethanolamine, propylene glycol, propylene carbonate, RJ-7033, RJ-7077, Silwet HS-312, Silwet HS-604, Silwet 625, Silwet 641, Silwet PD, XFO-10S FG Silicone, XFO-30S FG, KFO 200, poloxamers (i.e. nonionic triblock copolymers composed of a central hydrophobic chain of polyoxypropylene (poly(propylene oxide)) flanked by two hydrophilic chains of polyoxyethylene (poly(ethylene oxide))), P104, PE 3100, PE6800, polyethylene glycol, or polypropylene glycol, or a combination of the above.

In the dry concentrate 101, the weight percent of the adjuvant relative to the total weight of the dry concentrate 101 is about 0.01% to about 5.0%, preferably about 0.02% to about 4.5%, more preferably about 0.04% to about 4.0%, and particularly about 0.06% to about 3.5%.

In the final diluted product 103, the weight percent of the adjuvant relative to the total weight of the final diluted product 103 is about 0.006% to about 3.0%, preferably about 0.008% to about 2.8%, more preferably about 0.01% to about 2.6%, and particularly about 0.012% to about 2.4%.

In the liquid concentrate 201, the weight percent of the adjuvant relative to the total weight of the liquid concentrate 201 is about 0.01% to about 5.0%, preferably about 0.02% to about 4.5%, more preferably about 0.04% to about 4.0%, and particularly about 0.06% to about 3.5%.

In the final diluted product 202, the weight percent of the adjuvant relative to the total weight of the final diluted product 202 is about 0.006% to about 3.0%, preferably about 0.008% to about 2.8%, more preferably about 0.01% to about 2.6%, and particularly about 0.012% to about 2.4%.

The composition 100 and/or 200 may be uncolored (i.e., clear, natural colored, or free of colorants), or it may be colored using a colorant. The colorant may be a fugitive colorant, a non-fugitive colorant, or a combination of the two. The composition 100 and/or 200 has a first hue which is a color, i.e., either colorless or a color which blends with the normal vegetation and/or ground in the drop zone. This first hue may be grey or white or a combination of the two. The colorant initially colors the composition 100 and/or 200 to a second hue which contrasts with the hue of the ground vegetation. The colorant may be a fugitive component such as a dye or a dye which is dispersed in a matrix (i.e., a pigment), which fades over time and under ambient field conditions to a colorless or less highly colored hue. The colorant may be a mixture of an organic pigment (e.g., a fluorescent pigment) and inorganic pigment (e.g., iron oxide and/or titanium). Preferably the colorant is one that is compatible with the fire retardant salts described herein. The fugitive colorant may fade over time with exposure to sunlight. The fugitive colorant may also be a fast fade fugitive colorant that is designed to last a few hours to a few weeks, for example.

Several fugitive component dyes and pigments can be used as a colorant. The colorant may be a dye(s) and/or a pigment(s). For example, many water-soluble dyes fade rapidly and there are so-called fluorescent pigments (fluorescent dyes encapsulated in a resin integument or dispersed in a thermoplastic as an emulsion) which are suspended in forest fire retardant compositions and which also fade rapidly to provide a fugitive effect. The colorant may be an agricultural, pesticide, or food-grade dye or combinations of such dyes that are red, pink, claret, and/or cerise. Examples of fugitive dyes and pigments include, but are not limited to, C.I. Basic Red I dye, 6BL dye, Basic Violet II dye, C.I. Basic Violet 11:1 (tetrachlorozincate), C.I. Basic Red 1:1, Basic Yellow 40, acid fuchsin, basic fuchsin, new fuchsin, acid red 1, acid red 4, acid red 8, acid red 18, acid red 27, acid red 37, acid red 88, acid red 97, acid red 114, acid red 151, acid red 183, acid red 183, fast red violet 1B base, solvent red, Rhodamine B, Rhodamine 6G, Rhodamine 123, Rhodamine 110 chloride, erythrosine B, Basacryl red, Phloxine B, rose Bengal, direct red 80, direct red 80, Sudan red 7B, Congo red, neutral red, Fluorescent Red Mega 480, Fluorescent red 610, Fluorescent red 630, Fluorescent Red Mega 520, Pylaklor Red S-361, Pylaklor Scarlet LX-6364A Pylam Bright Red LX-1895 Pylam Coral LX-1801, FD&C Red #3, FD&C Red #4, FD&C Red #40, FD&C Red #4 Lake, D&C Red #33, D&C Red #33 Lake, and encapsulated-dye pigments which are available commercially, e.g., the "AX" series pigments, supplied by Day-Glo Color Corp., Cleveland, Ohio. The dye may be Liquitint 564 ($\lambda$=564 nm) or Liquitint Agro Pink 564 ($\lambda$=564 nm) from Milliken & Company (Spartanburg, S.C.). The colorant may also be an organic pigment such as a fluorescent pigment. The fluorescent pigment may be Day-Glo Aurora pink or another pink, red, orange, or crimson (or a combination of the four) fluorescent pigment dispersion. The fluorescent pigment may be UV sensitive and/or be substantially free of formaldehyde and/or have a Lab color spacing of "L" in a range from about 34 to about 89, "a" in a range from about 18 to about 83, and "b" in a range from about −61 to about 56, based on the International Commission of Illumination LAB color space model.

The colorant may be a colorant from Greenville Colorants (New Brunswick, N.J.) or Milliken & Company (Spartanburg, S.C.). For example, the colorant is a colorant that is compatible for use with the fire retardant salts described herein, such as colorants used in magnesium chloride dust-control and road-stabilization formulations, or in magnesium chloride de-icing formulations. The colorant may be Elcomine Scarlet NAS, Elcomine Scarlaet NAS EX, or Iron Oxide GC-110P from Greenville Colorants. The colorant may be a combination of Liquitint 564 and Iron Oxide GC-110P.

The colorant of the composition 100 and/or 200 may be a dye or include encapsulated-dye fugitive pigments without ultraviolet absorbers. Compared to water soluble dyes, encapsulated-dye pigments are less likely to permanently stain the normal vegetation and/or ground in the drop zone. The fugitive component is present in an amount which provides a color (second hues) to the forest fire retardant composition 100 and/or 200 which is contrasts with the color of the vegetation and/or ground in the drop zone (normally green, blue-green and/or brown). Advantageously, the second hue is red, orange or pink. The color of the dye may be red, orange, purple, or pink or any combination of the four. Preferably, the dye is one that is compatible with the fire retardant salts described herein. Alternatively, the composition 100 and/or 200 may be colorless if no colorant is added.

The colorant may also include a non-fugitive component, i.e., a component which is insoluble in the carrier liquid and which, if colored, does not necessarily fade after aerial application of the forest fire retardant composition 100 and/or 200. The non-fugitive component of the colorant is present in an amount sufficient to improve the aerial visibility of the composition when it is first applied to the vegetation. However, the non-fugitive component is present in less than an amount which prevents the composition from thereafter fading a neutral color. The colorant may be a combination of the fugitive and non-fugitive components. The non-fugitive component in the forest fire retardant composition 100 and/or 200 may be iron oxide ($Fe_2O_3$ and/or $Fe_3O_4$). The iron oxide may be present in combination with the fugitive colorant described above and titanium dioxide or it may be present alone. The weight of the non-fugitive colorant may contain a minimum of at least 12 grams of the non-fugitive colorant in accordance with Specification 5100-304d (Jan. 7, 2020), which is hereby incorporated by reference in its entirety.

In the dry concentrate 101, the weight percent of the organic pigment relative to the total weight of the dry concentrate 101 is about 0.2% to about 6.0%, preferably about 0.4% to about 5.5%, more preferably about 0.6% to about 5.0%, and particularly about 0.8% to about 4.5%.

In the final diluted product 103, the weight percent of the organic pigment relative to the total weight of the final diluted product 103 is about 0.0125% to about 5.0%, preferably about 0.025% to about 4.5%, more preferably about 0.75% to about 4.0%, and particularly about 0.1% to about 3.5%.

In the liquid concentrate 201, the weight percent of the organic pigment relative to the total weight of the liquid concentrate 201 is about 0.2% to about 6.0%, preferably about 0.4% to about 5.5%, more preferably about 0.6% to about 5.0%, and particularly about 0.8% to about 4.5%.

In the final diluted product 202, the weight percent of the organic pigment relative to the total weight of the final diluted product 202 is about 0.0125% to about 5.0%, preferably about 0.025% to about 4.5%, more preferably about 0.75% to about 4.0%, and particularly about 0.1% to about 3.5%.

The composition 100 and/or 200 may also include an inorganic pigment. The inorganic pigment may act as a colorant. The inorganic pigment may include but is not limited to Iron Oxide, titanium dioxide, magnesium hydroxide, cobalt blue, cerulean blue, malachite, earth green, raw umber, raw sienna, iron black, or burnt sienna. The Iron Oxide may act as an opacifier. The titanium dioxide may act as a pigment, for example, to provide a white pigment. The titanium dioxide may also act as a photo-responsive material to create opacity by scattering light or by protecting the components of the forest fire retardant composition 100 and/or 200 from UV degradation.

In the dry concentrate 101, the weight percent of the inorganic pigment relative to the total weight of the dry concentrate 101 is about 0.01% to about 3.5%, preferably about 0.02% to about 3.0%, more preferably about 0.04% to about 2.5%, and particularly about 0.06% to about 2.0%.

In the final diluted product 103, the weight percent of the inorganic pigment relative to the total weight of the final diluted product 103 is about 0.006% to about 2.0%, preferably about 0.008% to about 1.8%, more preferably about 0.01% to about 1.6%, and particularly about 0.012% to about 1.4%.

In the liquid concentrate 201, the weight percent of the inorganic pigment relative to the total weight of the liquid concentrate 201 is about 0.01% to about 3.5%, preferably about 0.02% to about 3.0%, more preferably about 0.04% to about 2.5%, and particularly about 0.06% to about 2.0%.

In the final diluted product 202, the weight percent of the inorganic pigment relative to the total weight of the final diluted product 202 is about 0.006% to about 2.0%, preferably about 0.008% to about 1.8%, more preferably about 0.01% to about 1.6%, and particularly about 0.012% to about 1.4%.

In the dry concentrate 101, the weight percent of the total colorant relative to the total weight of the dry concentrate 101 is about 0.01% to about 7.0%, preferably about 0.02% to about 6.5%, more preferably about 0.04% to about 6.0%, and particularly about 0.06% to about 5.5%.

In the final diluted product 103, the weight percent of the total colorant relative to the total weight of the final diluted product 103 is about 0.06% to about 5.0%, preferably about 0.08% to about 4.5%, more preferably about 0.1% to about 4.0%, and particularly about 0.12% to about 3.5%.

In the liquid concentrate 201, the weight percent of the total colorant relative to the total weight of the liquid concentrate 201 is about 0.01% to about 7.0%, preferably about 0.02% to about 6.5%, more preferably about 0.04% to about 6.0%, and particularly about 0.06% to about 5.5%.

In the final diluted product 202, the weight percent of the total colorant relative to the total weight of the final diluted product 202 is about 0.02% to about 5.0%, preferably about 0.04% to about 4.5%, more preferably about 0.06% to about 4.0%, and particularly about 0.08% to about 3.5%.

The composition 100 and/or 200 may also include a glow-in-the-dark additive. The glow-in-the-dark additive improves the visibility of the fire retardant composition during periods of darkness. Nighttime visibility of the composition is improved, for example, to the naked human eye and/or using imaging equipment such as goggles. The glow-in-the-dark additive can include one or more phosphorescent additives that imparts photoluminescence properties to the forest fire retardant composition 100 and/or 200. The phosphorescent additive may exhibit fluorescence and/or phosphorescence. The phosphorescent additive may be charged with sunlight or artificial lighting, such as UV radiation or Fluorescent lighting. The phosphorescent additive may emit light in the visible light region or in the ultraviolet region. Alternatively, the phosphorescent additive may emit light in the near infrared region and be visualized using infrared goggles. Examples of the phosphorescent additive include LumiNova, LumiNova Green (G), LumiNova G PS-2, LumiNova Blue Green (BG), a zinc sulfide pigment, or mixtures thereof. The amount of the glow-in-the-dark additive, relative to the amount of composition 100 and/or 200 is about 100 g/1000 L to about 1000 g/1000 L, preferably about 200 g/1000 L to about 800 g/1000 L, and more preferably about 300 g/1000 L to about 700 g/1000 L. For example, the amount of the glow-in-the-dark additive, relative to the amount of composition 100 and/or 200 is about 350 g/1000 L to about 550 g/1000 L.

The glow-in the-dark additive may also include one or more fluorophores. The fluorophore(s) may exhibit fluorescence and/or phosphorescence. The fluorophore(s) may be visible in the near infrared region (i.e., 700 nm-1700 nm wavelength of light). Visualization can be achieved using near infrared goggles. Examples of fluorophores include CH1055 (4.8-Bis(2-(4-(bis(4-(2-carboxyethyl)phenyl) amino)phenyl)-5H-[1,2,5]thiadiazolo[3,4-f]benzo[c][1,2,5] thiadiazole), as well as Cy7 or Cy7.5, or mixtures thereof. Glow-in-the-dark additives that exhibit fluorescence include fluorescent pigments described above.

The composition 100 and/or 200 may optionally include other ingredients, such as spoilage inhibitors, flow conditioners, anti-foaming agents, foaming agents, stability additives, biocide, thickening agents, surfactants, adjuvants, corrosion inhibitors other than those of the corrosion inhibiting system, opacifiers, additional coloring agents, liquid carrier, dedusters, and water. The deduster may include mineral oil.

In the dry concentrate 101, the weight percent of the mineral oil relative to the total weight of the dry concentrate 101 is about 0.01% to about 3.5%, preferably about 0.02% to about 3.0%, more preferably about 0.04% to about 2.5%, and particularly about 0.06% to about 2.0%.

In the final diluted product 103, the weight percent of the mineral oil relative to the total weight of the final diluted product 103 is about 0.006% to about 2.0%, preferably about 0.008% to about 1.8%, more preferably about 0.01% to about 1.6%, and particularly about 0.012% to about 1.4%.

In the liquid concentrate 201, the weight percent of the mineral oil relative to the total weight of the liquid concentrate 201 is about 0.01% to about 3.5%, preferably about 0.02% to about 3.0%, more preferably about 0.04% to about 2.5%, and particularly about 0.06% to about 2.0%.

In the final diluted product 202, the weight percent of the mineral oil relative to the total weight of the final diluted product 202 is about 0.006% to about 2.0%, preferably about 0.008% to about 1.8%, more preferably about 0.01% to about 1.6%, and particularly about 0.012% to about 1.4%.

Formation of the Dry Concentrate 101

The dry components of the forest fire retardant composition 100 are batch mixed in a tumbler to form a dry concentrate 101. Alternatively, the dry components may be continuously mixed. In one embodiment the organic amine (e.g., triethanolamine), corrosion inhibitor, and water may be added as a pack to the dry concentrate 101. The pack may include water to assist with mixing the components of the dry concentrate. In another embodiment the pack may also include the colorant. In another embodiment the salt(s) may be mixed with water and then dehydrated before being added to the dry concentrate 101. The resulting dehydrated salt mixture may include a mixture of sodium ammonium hydrates including sodium ammonium tetrahydrate, for example. The dry concentrate 101 is then stored, substantially in the absence of air and/or external moisture, in a sealed bag having a plastic liner and/or moisture barrier. For example, each sealed bag can contain about 2,000 pounds of the dry concentrate 101 during storage and shipment to the point of use (e.g., airfield). Alternatively, the dry concentrate 101 may be stored in lined one-ton tote sacks or super sacks. Air-sealed bags with a plastic liner supplied by Semi-Bulk Systems Inc. (St. Louis, Mo.) can be used. Alternatively, an air-permeable moisture barrier can be used, such as a barrier made of a silicone material. The dry concentrate 101 is substantially free of water. The dry composition 101 is chemically stable under normal temperatures and pressures. The dry concentrate 101 should be protected from exposure to humidity and moisture on moisture-proof air pallets or under a water-resistant tarp during storage. The dry concentrate 101 may be supplied as part of a kit that includes a sealed container substantially in the absence of air and/or external moisture (e.g., air-sealed bag, air-permeable moisture sealed bag, tote sack, super sack) and instructions for using the dry concentrate 101 to form the final diluted product 103 (described below). In the case where the final diluted product 103 is to be applied on a localized scale by homeowners or local officials, for example, the kit may contain a tank for mixing and applying the final diluted product 103 (e.g., a 1-2 gallon hand-held or 4 gallon backpack or 5 gallon cart-style container with an applicator wand and/or hose, or a 15-25 gallon tank capable of being mounted on or pulled behind an all-terrain vehicle or truck), and instructions for using the dry concentrate 101 to form and apply the final diluted product 103.

Forming the Intermediate Liquid Concentrate 102

The liquid concentrate 102 may be formed by the addition of water or other solvent to the dry concentrate 101. The water may be tap water or water from other convenient water sources. Alternatively, the liquid concentrate 102 may be formed upon absorption of moisture by the dry concentrate 101 if the dry concentrate 101 is deliquescent.

The dry concentrate 101 is first mixed to disperse the thickening agent(s) in the dry blend before any liquid additions. The dry concentrate 101 is agitated to prevent clumping of the dry components when batch mixed with water or other solvent to form the liquid concentrate 102. Alternatively, the liquid concentrate 102 may be prepared using continuous mixing equipment. Alternatively, the water or other solvent may be added by spraying onto a ribbon of well-mixed dry ingredients. For example, the water or other solvent could be sprayed onto the dry components while traveling across a conveyor belt. Once mixed, the liquid concentrate 102 is then stored, substantially in the absence of air, in a sealed container. For example, the sealed container for storage and shipment to the point of use (e.g., airfield) may be a 1,000 L tote, a 5-gallon pail or a 55-gallon drum. The liquid concentrate 102 is chemically stable under normal temperatures and pressures.

The liquid concentrate 102 may be supplied as part of a kit that includes a sealed container for storage and shipment substantially in the absence of air and/or external moisture (e.g., 1,000 L tote, a 5-gallon pail or a 55-gallon drum) and instructions for using the liquid concentrate 102 to form the final diluted product 103 (described below). In the case where the final diluted product 103 is to be applied on a localized scale by homeowners or local officials, for example, the kit may contain a tank for mixing and applying the final diluted product 103 (e.g., a 1-2 gallon hand-held or 4 gallon backpack or 5 gallon cart-style container with an applicator wand and/or hose, or a 15-25 gallon tank capable of being mounted on or pulled behind an all-terrain vehicle or truck), and instructions for using the liquid concentrate 102 to form and apply the final diluted product 103.

Forming the Final Diluted Product 103

The final diluted product 103 is formed either directly from the dry concentrate 101 by mixing the dry concentrate 101 with water or by mixing the liquid concentrate 102 with water. The dry concentrate 101 or the liquid concentrate 102 is shipped to the point of use (e.g., airfield), where it is diluted with water or other solvent to form the final diluted product 103. The dry concentrate 101 is added slowly into room temperature (or cooler) water with stirring. The water may be tap water or water from other convenient water sources. The product is mixed using the current mixing equipment available to the USFS.

The reaction exhibits a low exotherm and a good mix ratio. The product is stirred for about 2-30 minutes depending on the mixing technology and the scale. The final diluted product 103 can also be prepared on a commercial batch scale by combining the dry concentrate 101 with a measured amount of water in an appropriate mix vessel such as an agitated mix tank. Alternatively, the final diluted product 103 may be prepared on a commercial batch scale using continuous mixing equipment. The rate of addition of solid concentrate to water should be controlled to assure efficient mixing of the concentrate and the water. Alternately, a continuous process may be conducted by introducing the dry concentrate 101 into a water stream via a vacuum eductor system. Downstream mixing should be accomplished to avoid product settling in the receiving tank, or the receiving tank itself should be vigorously circulated to facilitate solution and adequate hydration of the dry concentrate 101.

The final diluted composition 103 can also be batch mixed by feeding the dry concentrate 101 into a well-circulated mix-batch tank. Alternatively, the final diluted composition 103 may be mixed using continuous mixing equipment. Mix tank agitation may be provided via an overhead mechanical stirring apparatus or alternatively by a circulation pump sized to provide turbulent mixing. Alternatively, a venturi-type vacuum eductor mixer or an in-line high-shear mixer can be used. For batch mixing, the mix water is agitated or circulated to provide efficient mixing, then a one-ton sack of dry concentrate 101 is added slowly, typically by suspending the sack over the mix tank (via a fork lift or by other manner), and opening the discharge spout on the sack to allow product to flow out of the sack into the mix solution. The addition rate should be controlled to avoid settling of the solid concentrate in the mix tank. The final diluted product 103 is in a form suitable to fight forest fires via aerial- or ground-based application.

The dry concentrate 101 may be diluted with water so that the final diluted product 103 has a retardant compound (e.g. salt) weight percent of about 2% to about 70%, preferably about 5% to about 40%, more preferably about 7% to about 30%. For example, the concentration of retardant compound (e.g., salt) in final diluted product 103 is about 8% to about 25%.

The liquid concentrate 102 may be diluted with water so that the final diluted product 103 has a retardant compound (e.g. salt) weight percent of about 2% to about 70%, preferably about 5% to about 40%, more preferably about 7% to about 30%. For example, the concentration of retardant compound (e.g., salt) in final diluted product 103 is about 8% to about 25%.

The final diluted product 103 is a long-term forest fire retardant with improved aerial visibility for either a direct or indirect attack. The resulting final diluted product 103 is an opaque reddish and/or pinkish and/or orangish suspension that resists settling. The final diluted product 103 should be mixed approximately every 7-10 days to ensure uniform density. The viscosity of the final diluted product 103 can be adjusted to accommodate a variety of aircrafts by adjusting the amounts of thickening agent(s) added to the mixture. The final diluted product 103 may be a low, medium, or high viscosity long term retardant. The viscosity may be in the range of 150-400 cP, 401 cP to 800 cP, or >801 cP, for a low, medium, or high viscosity long term retardant, respectively. The final diluted product 103 may alternatively be a high viscosity long term retardant through the addition of more thickening agent. Alternatively, the final diluted product 103 may be a low viscosity long term retardant through the use of less thickening agent. Once blended with water, the final diluted product 103 is a homogeneous, stable fluid that requires only infrequent stirring. The final diluted product 103 is hydrated into a stable mixture in 20 minutes, without the use of special equipment.

Forming the Liquid Concentrate 201

The components of the forest fire retardant composition 200 are batch mixed to form a liquid concentrate 201. Alternatively, the forest fire retardant composition 200 may be mixed using continuous mixing equipment. The mixing should be controlled to ensure that all of the dry components are adequately dispersed and hydrated to ensure that the formulation is maintained. The water in the liquid composition 201 may be tap water or water from other convenient water sources. The liquid composition 201 is chemically stable under normal temperatures and pressures. Once mixed, the liquid concentrate 201 is then stored, substantially in the absence of air and/or external moisture, in a sealed container. The liquid concentrate 201 should be protected from exposure to humidity and moisture. For example, the sealed container for storage and shipment to the point of use (e.g., airfield) may be a 1,000 L tote, a 5-gallon pail or a 55-gallon drum. The liquid concentrate 201 is chemically stable under normal temperatures and pressures.

The liquid concentrate 201 may be supplied as part of a kit that includes a sealed container for storage and shipment, substantially in the absence of air and/or external moisture, (e.g., 1,000 L tote, a 5-gallon pail or a 55-gallon drum) and instructions for using the liquid concentrate 201 to form the final diluted product 202 (described below). Air-sealed bags with a plastic liner supplied by Semi-Bulk Systems Inc. (St. Louis, Mo.) can be used. Alternatively, an air-permeable moisture barrier can be used, such as a barrier made of a silicone material. In the case where the final diluted product 202 is to be applied on a localized scale by homeowners or local officials, for example, the kit may contain a tank for mixing and applying the final diluted product 202 (e.g., a 1-2 gallon hand-held or 4 gallon backpack or 5 gallon cart-style container with an applicator wand and/or hose, or a 15-25 gallon tank capable of being mounted on or pulled behind an all-terrain vehicle or truck), and instructions for using the liquid concentrate 201 to form and apply the final diluted product 202.

Forming the Final Diluted Product 202

The final diluted product 202 is formed by mixing the liquid concentrate 201 with water. The liquid concentrate 201 is shipped to the point of use (e.g., airfield), where it is diluted with water or other solvent to form the final diluted product 202. The water may be tap water or water from other convenient water sources. The product is mixed using the current mixing equipment available to the USFS. The liquid concentrate 201 is very miscible in water and special mixing precautions are not necessary other than to limit splash escaping the mixing vessel. The tank contents should be circulated via a centrifugal pump or another stirring means to ensure uniform mixing.

The reaction has a low exotherm and a good mix ratio. The product is stirred for about 20-30 minutes before being allowed to stand to develop a stable viscosity and ensure a uniform mixture. The final diluted product 202 can also be prepared on a commercial batch scale by combining the liquid concentrate 201 with a measured amount of water in an appropriate mix vessel such as an agitated mix tank. Alternatively, the final diluted composition 202 may be prepared on a commercial batch scale using continuous mixing equipment. The rate of addition of liquid concentrate to water should be controlled to assure efficient mixing of the concentrate and the water. The final diluted product 202 forms a stable suspension and should be stirred after standing to eliminate any settling of the components.

The final diluted composition 202 can also be batch mixed by feeding the liquid concentrate 201 into a well-circulated mix-batch tank. Alternatively, the final diluted composition 202 may be mixed using continuous mixing equipment. Mix tank agitation may be provided via an overhead mechanical stirring apparatus or alternatively by a circulation pump sized to provide turbulent mixing. Alternatively, a venturi-type vacuum eductor mixer or an in-line high-shear mixer can be used. The final diluted product 202 is in a form suitable to fight forest fires via aerial- or ground-based application.

In the final diluted product 202, the weight percent of retardant compound (e.g., salt) is about 2% to about 70%, preferably about 5% to about 40%, more preferably about 7% to about 30%. For example, the concentration of retardant compound (e.g., salt) in final diluted product 202 is about 8% to about 15%, and specifically about 9.5%±2%.

The final diluted product 202 is a long-term forest fire retardant with improved aerial visibility for either a direct or indirect attack. The resulting final diluted product 202 is an opaque pink or red-purple suspension that resists settling. The final diluted product 202 should be mixed approximately every 7-10 days to ensure uniform density. The viscosity of the final diluted product 202 can be adjusted to accommodate a variety of aircrafts by adjusting the amounts of thickening agent(s) added to the mixture. The final diluted product 202 may be a may be a low, medium, or high viscosity long term retardant. The viscosity may be in the range of 150-400 cP, 401 cP to 800 cP, or >801 cP, for a low, medium, or high viscosity long term retardant, respectively. Once blended with water, the final diluted product 202 is a homogeneous, stable fluid that requires only infrequent stirring. The final diluted product 202 is hydrated into a stable mixture in 20 minutes, without the use of special equipment.

EXAMPLES

Example 1

In Example 1, a dry concentrate was prepared containing the amounts of ingredients listed in Table 2 below. The values in Table 2 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 2

Dry Concentrate according to Example 1

| Ingredient | Weight Percent of Each Ingredient in Dry Concentrate |
|---|---|
| DAP | 90.44% |
| Mineral Oil | 0.85% |
| Corrosion Inhibitor (approximately 40% water) | 3.41% |
| Thickening agent 1 - Polysaccharide gum | 2.56% |
| Red Iron Oxide | 0.17% |
| Fluorescent Pigment | 1.71% |
| Surfactant | 0.85% |
| Water | 0.00% |
| Total Weight of Dry Concentrate | 100% |

In Example 1, the final diluted product 103 was prepared by mixing approximately 1.10 pounds of the dry concentrate in 1 gallon of water. The amounts of the ingredients in the Example 1 final diluted product 103 are listed in Table 3 below. The values in Table 3 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 1 final diluted product 103 is about 5% to 20% by weight in water, preferably about 6% to 18%, more preferably about 7% to 16%. For example, the weight percent of salt in the Example 1 final diluted product 103 is about 10.6%±1.0%.

TABLE 3

Final Diluted Product according to Example 1

| Ingredient | Weight Percent of Each Ingredient in Final Diluted Product |
|---|---|
| DAP | 10.60% |
| Mineral Oil | 0.10% |
| Corrosion Inhibitor (approximately 40% water) | 0.40% |
| Thickening agent 1 - Polysaccharide gum | 0.30% |
| Red Iron Oxide | 0.02% |
| Fluorescent Pigment | 0.20% |
| Surfactant | 0.10% |
| Water | 88.28% |
| Total Weight of Final Diluted Product | 100% |

The density of the final diluted product 103 of Example 1 may be in the range of about 0.8 g/mL to about 1.3 g/mL, for example about 1.0 g/mL to about 1.2 g/mL. The pH of the final diluted product 103 of Example 1 may be in the range of about 7.5 to about 8.5, for example about 8.0. The N/P molar ratio of the final diluted product 103 of Example 1 may be in the range of about 1.5 to about 2.5, for example about 2. The ionic molarity of the final diluted product 103 of Example 1 may be in the range of about 2.0 to about 3.0, for example about 2.6.

Example 2

In Example 2, a dry concentrate was prepared containing the amounts of ingredients listed in Table 4 below. The values in Table 4 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 4

Dry Concentrate according to Example 2

| Ingredient | Weight Percent of Each Ingredient in Dry Concentrate |
|---|---|
| DAP | 92.56% |
| Mineral Oil | 0.44% |
| Corrosion Inhibitor (approximately 40% water) | 0.44% |
| Thickening agent 1 - Polysaccharide gum | 3.06% |
| Red Iron Oxide | 0.31% |
| Fluorescent Pigment | 3.06% |
| Surfactant | 0.15% |
| Water | 0.00% |
| Total Weight of Dry Concentrate | 100% |

In Example 2, the final diluted product 103 was prepared by mixing approximately 1.02 pounds of the dry concentrate in 1 gallon of water. The amounts of the ingredients in the Example 2 final diluted product 103 are listed in Table 5 below. The values in Table 5 can be varied by ±0.01%, or ±0.05%, or ±0.1%, or ±0.5%, or ±1.0%, or +1.5%, or +2%, or ±2.5%, or ±3.0%, or ±3.5%, or ±4.0%, or ±4.5%, or ±5.0%. The concentration of salt in the Example 2 final diluted product 103 is about 5% to 20% by weight in water, preferably about 6% to 18%, more preferably about 7% to 16%. For example, the weight percent of salt in the Example 2 final diluted product 103 is about 10.6%±1.0%.

TABLE 5

Final Diluted Product according to Example 2

| Ingredient | Weight Percent of Each Ingredient in Final Diluted Product |
|---|---|
| DAP | 10.60% |
| Mineral Oil | 0.05% |
| Corrosion Inhibitor (approximately 40% water) | 0.05% |
| Thickening agent 1 - Polysaccharide gum | 0.35% |
| Red Iron Oxide | 0.04% |
| Fluorescent Pigment | 0.35% |
| Surfactant | 0.02% |
| Water | 88.55% |
| Total Weight of Final Diluted Product | 100% |

The density of the final diluted product 103 of Example 2 may be in the range of about 0.8 g/mL to about 1.3 g/mL, for example about 1.0 g/mL to about 1.2 g/mL. The pH of the final diluted product 103 of Example 2 may be in the range of about 7.5 to about 8.5, for example about 8.0. The N/P molar ratio of the final diluted product 103 of Example 2 may be in the range of about 1.5 to about 2.5, for example about 2. The ionic molarity of the final diluted product 103 of Example 2 may be in the range of about 2.0 to about 3.0, for example about 2.6.

Example 3

In Example 3, a dry concentrate was prepared containing the amounts of ingredients listed in Table 6 below. The values in Table 6 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 6

Dry Concentrate according to Example 3

| Ingredient | Weight Percent of Each Ingredient in Dry Concentrate |
|---|---|
| DAP | 92.36% |
| Mineral Oil | 0.44% |
| Corrosion Inhibitor (approximately 40% water) | 0.65% |
| Thickening agent 1 - Polysaccharide gum | 3.05% |
| Red Iron Oxide | 0.30% |
| Fluorescent Pigment | 3.05% |
| Surfactant | 0.15% |
| Water | 0.00% |
| Total Weight of Dry Concentrate | 100% |

In Example 3, the final diluted product 103 was prepared by mixing approximately 1.02 pounds of the dry concentrate in 1 gallon of water. The amounts of the ingredients in the Example 3 final diluted product 103 are listed in Table 7 below. The values in Table 7 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 3 final diluted product 103 is about 5% to 20% by weight in water, preferably about 6% to 18%, more preferably about 7% to 16%. For example, the weight percent of salt in the Example 3 final diluted product 103 is about 10.6%±1.0%.

TABLE 7

Final Diluted Product according to Example 3

| Ingredient | Weight Percent of Each Ingredient in Final Diluted Product |
|---|---|
| DAP | 10.600% |
| Mineral Oil | 0.050% |
| Corrosion Inhibitor (approximately 40% water) | 0.075% |
| Thickening agent 1 - Polysaccharide gum | 0.350% |
| Red Iron Oxide | 0.035% |
| Fluorescent Pigment | 0.350% |
| Surfactant | 0.017% |
| Water | 88.523% |
| Total Weight of Final Diluted Product | 100% |

The density of the final diluted product 103 of Example 3 may be in the range of about 0.8 g/mL to about 1.3 g/mL, for example about 1.0 g/mL to about 1.2 g/mL. The pH of the final diluted product 103 of Example 3 may be in the range of about 7.5 to about 8.5, for example about 8.0. The N/P molar ratio of the final diluted product 103 of Example 3 may be in the range of about 1.5 to about 2.5, for example about 2. The ionic molarity of the final diluted product 103 of Example 3 may be in the range of about 2.0 to about 3.0, for example about 2.6.

Example 4—Prophetic Example

In Example 4, a dry concentrate is prepared containing the amounts of ingredients listed in Table 8 below. The values in Table 8 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 8

Dry Concentrate according to Example 4

| Ingredient | Weight Percent of Each Ingredient in Dry Concentrate |
|---|---|
| MAP | 92.36% |
| Mineral Oil | 0.44% |
| Corrosion Inhibitor (approximately 40% water) | 0.65% |
| Thickening agent 1 - Polysaccharide gum | 3.05% |
| Red Iron Oxide | 0.30% |
| Fluorescent Pigment | 3.05% |
| Surfactant | 0.15% |
| Water | 0.00% |
| Total Weight of Dry Concentrate | 100% |

In Example 4, the final diluted product 103 is prepared by mixing approximately 1.02 pounds of the dry concentrate in 1 gallon of water. The amounts of the ingredients in the Example 4 final diluted product 103 are listed in Table 9 below. The values in Table 9 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 4 final diluted product 103 is about 5% to 20% by weight in water, preferably about 6% to 18%, more preferably about 7% to 16%. For example, the weight percent of salt in the Example 4 final diluted product 103 is about 10.6%±1.0%.

TABLE 9

Final Diluted Product according to Example 4

| Ingredient | Weight Percent of Each Ingredient in Final Diluted Product |
|---|---|
| MAP | 10.600% |
| Mineral Oil | 0.050% |
| Corrosion Inhibitor (approximately 40% water) | 0.075% |
| Thickening agent 1 - Polysaccharide gum | 0.350% |
| Red Iron Oxide | 0.035% |
| Fluorescent Pigment | 0.350% |
| Surfactant | 0.017% |
| Water | 88.523% |
| Total Weight of Final Diluted Product | 100% |

The density of the final diluted product 103 of Example 4 may be in the range of about 0.8 g/mL to about 1.3 g/mL, for example about 1.0 g/mL to about 1.2 g/mL. The N/P molar ratio of the final diluted product 103 of Example 4 may be in the range of about 1.5 to about 2.5, for example about 2. The ionic molarity of the final diluted product 103 of Example 4 may be in the range of about 1.5 to about 2.5, for example about 2.0.

Example 5

In Example 5, a dry concentrate was prepared containing the amounts of ingredients listed in Table 10 below. The values in Table 10 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 10

Dry Concentrate according to Example 5

| Ingredient | Weight Percent of Each Ingredient in Dry Concentrate |
|---|---|
| MAP | 69.69% |
| Mineral Oil | 0.38% |
| Corrosion Inhibitor (approximately 40% water) | 0.38% |
| Buffering Agent | 24.23% |
| Thickening agent 1 - Polysaccharide gum | 2.27% |
| Red Iron Oxide | 0.27% |
| Fluorescent Pigment | 2.65% |
| Surfactant | 0.13% |
| Water | 0.00% |
| Total Weight of Dry Concentrate | 100% |

In Example 5, the final diluted product 103 was prepared by mixing approximately 1.17 pounds of the dry concentrate in 1 gallon of water. The amounts of the ingredients in the Example 5 final diluted product 103 are listed in Table 11 below. The values in Table 11 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 5 final diluted product 103 is about 5% to 20% by weight in water, preferably about 6% to 18%, more preferably about 7% to 16%. For example, the weight percent of salt in the Example 5 final diluted product 103 is about 9.2%±1.0%.

TABLE 11

Final Diluted Product according to Example 5

| Ingredient | Weight Percent of Each Ingredient in Final Diluted Product |
|---|---|
| MAP | 9.200% |
| Mineral Oil | 0.050% |
| Corrosion Inhibitor (approximately 40% water) | 0.050% |
| Buffering Agent | 3.199% |
| Thickening agent 1 - Polysaccharide gum | 0.300% |
| Red Iron Oxide | 0.035% |
| Fluorescent Pigment | 0.350% |
| Surfactant | 0.017% |
| Water | 86.799% |
| Total Weight of Final Diluted Product | 100% |

The density of the final diluted product 103 of Example 5 may be in the range of about 0.8 g/mL to about 1.3 g/mL, for example about 1.0 g/mL to about 1.2 g/mL. The pH of the final diluted product 103 of Example 5 may be in the range of about 7.2 to about 8.2, for example about 7.86. The N/P molar ratio of the final diluted product 103 of Example 5 may be in the range of about 0.5 to about 1.5, for example about 1.0. The ionic molarity of the final diluted product 103 of Example 5 may be in the range of about 2.0 to about 3.0, for example about 2.6.

Example 6

In Example 6, a dry concentrate was prepared containing the amounts of ingredients listed in Table 12 below. The values in Table 12 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 12

Dry Concentrate according to Example 6

| Ingredient | Weight Percent of Each Ingredient in Dry Concentrate |
|---|---|
| SAP-TH | 95.05% |
| Mineral Oil | 0.28% |
| Corrosion Inhibitor (approximately 40% water) | 0.42% |
| Thickening agent 1 - Polysaccharide gum | 1.97% |
| Red Iron Oxide | 0.20% |
| Fluorescent Pigment | 1.97% |
| Surfactant | 0.10% |
| Water | 0.00% |
| Total Weight of Dry Concentrate | 100% |

In Example 6, the final diluted product 103 was prepared by mixing approximately 1.58 pounds of the dry concentrate in 1 gallon of water. The amounts of the ingredients in the Example 6 final diluted product 103 are listed in Table 13 below. The values in Table 13 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 6 final diluted product 103 is about 5% to 30% by weight in water, preferably about 10% to 25%, more preferably about 12% to 22%. For example, the weight percent of salt in the Example 6 final diluted product 103 is about 16.9%±1.0%.

TABLE 13

Final Diluted Product according to Example 6

| Ingredient | Weight Percent of Each Ingredient in Final Diluted Product |
|---|---|
| SAP-TH | 16.850% |
| Mineral Oil | 0.050% |
| Corrosion Inhibitor (approximately 40% water) | 0.075% |
| Thickening agent 1 - Polysaccharide gum | 0.350% |
| Red Iron Oxide | 0.035% |
| Fluorescent Pigment | 0.350% |
| Surfactant | 0.017% |
| Water | 82.273% |
|  | 16.850% |
| Total Weight of Final Diluted Product | 100% |

The density of the final diluted product 103 of Example 6 may be in the range of about 0.8 g/mL to about 1.3 g/mL, for example about 1.0 g/mL to about 1.2 g/mL. The pH of the final diluted product 103 of Example 6 may be in the range of about 7.2 to about 8.2, for example about 7.73. The N/P molar ratio of the final diluted product 103 of Example 6 may be in the range of about 0.5 to about 1.5, for example about 1.0. The ionic molarity of the final diluted product 103 of Example 6 may be in the range of about 2.0 to about 3.0, for example about 2.6.

Example 7

In Example 7, a dry concentrate was prepared containing the amounts of ingredients listed in Table 14 below. The values in Table 14 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 14

Dry Concentrate according to Example 7

| Ingredient | Weight Percent of Each Ingredient in Dry Concentrate |
|---|---|
| DAP | 44.63% |
| DSP | 47.98% |
| Mineral Oil | 0.42% |
| Corrosion Inhibitor (approximately 40% water) | 0.63% |
| Thickening agent 1 - Polysaccharide gum | 2.95% |
| Red Iron Oxide | 0.29% |
| Fluorescent Pigment | 2.95% |
| Surfactant | 0.14% |
| Water | 0.00% |
| Total Weight of Dry Concentrate | 100% |

In Example 7, the final diluted product 103 was prepared by mixing approximately 1.06 pounds of the dry concentrate in 1 gallon of water. The amounts of the ingredients in the Example 7 final diluted product 103 are listed in Table 15 below. The values in Table 15 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 7 final diluted product 103 is about 5% to 20% by weight in water, preferably about 6% to 18%, more preferably about 7% to 16%. For example, the weight percent of salt in the Example 7 final diluted product 103 is about 11.0%±1.0%.

TABLE 15

Final Diluted Product according to Example 7

| Ingredient | Weight Percent of Each Ingredient in Final Diluted Product |
|---|---|
| DAP | 5.300% |
| DSP | 5.698% |
| Mineral Oil | 0.050% |
| Corrosion Inhibitor (approximately 40% water) | 0.075% |
| Thickening agent 1 - Polysaccharide gum | 0.350% |
| Red Iron Oxide | 0.035% |
| Fluorescent Pigment | 0.350% |
| Surfactant | 0.017% |
| Water | 88.126% |
| Total Weight of Final Diluted Product | 100% |

The density of the final diluted product 103 of Example 7 may be in the range of about 0.8 g/mL to about 1.3 g/mL, for example about 1.0 g/mL to about 1.2 g/mL. The pH of the final diluted product 103 of Example 7 may be in the range of about 7.2 to about 8.2, for example about 7.73. The N/P molar ratio of the final diluted product 103 of Example 7 may be in the range of about 0.5 to about 1.5, for example about 1.0. The ionic molarity of the final diluted product 103 of Example 7 may be in the range of about 2.0 to about 3.0, for example about 2.6.

Example 8

In Example 8, a dry concentrate was prepared containing the amounts of ingredients listed in Table 16 below. The values in Table 16 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 16

Dry Concentrate according to Example 8

| Ingredient | Weight Percent of Each Ingredient in Dry Concentrate |
|---|---|
| MAP | 71.28% |
| Buffering Agent | 22.51% |
| Corrosion Inhibitor (approximately 40% water) | 0.56% |
| Thickening agent 1 - Polysaccharide gum | 2.63% |
| Red Iron Oxide | 0.26% |
| Fluorescent Pigment | 2.63% |
| Surfactant | 0.13% |
| Water | 0.00% |
| Total Weight of Dry Concentrate | 100% |

In Example 8, the final diluted product 103 was prepared by mixing approximately 1.28 pounds of the dry concentrate in 1 gallon of water. The amounts of the ingredients in the Example 8 final diluted product 103 are listed in Table 17 below. The values in Table 17 can be varied by ±0.01%, or ±0.05%, or ±0.1%, or ±0.5%, or ±1.0%, or +1.5%, or ±2%, or ±2.5%, or ±3.0%, or ±3.5%, or ±4.0%, or ±4.5%, or ±5.0%. The concentration of salt in the Example 8 final diluted product 103 is about 5% to 20% by weight in water, preferably about 6% to 18%, more preferably about 7% to 16%. For example, the weight percent of salt in the Example 8 final diluted product 103 is about 9.5%±1.0%.

TABLE 17

Final Diluted Product according to Example 8

| Ingredient | Weight Percent of Each Ingredient in Final Diluted Product |
|---|---|
| MAP | 9.500% |
| Buffering Agent | 3.000% |
| Corrosion Inhibitor (approximately 40% water) | 0.075% |
| Thickening agent 1 - Polysaccharide gum | 0.350% |
| Red Iron Oxide | 0.035% |
| Fluorescent Pigment | 0.350% |
| Surfactant | 0.017% |
| Water | 86.673% |
| Total Weight of Final Diluted Product | 100% |

The density of the final diluted product 103 of Example 8 may be in the range of about 0.8 g/mL to about 1.3 g/mL, for example about 1.0 g/mL to about 1.2 g/mL. The pH of the final diluted product 103 of Example 8 may be in the range of about 5.5 to about 6.5, for example about 6.2. The N/P molar ratio of the final diluted product 103 of Example 8 may be in the range of about 0.5 to about 1.5, for example about 1.0. The ionic molarity of the final diluted product 103 of Example 8 may be in the range of about 1.5 to about 2.5, for example about 2.1.

Example 9

In Example 9, a dry concentrate was prepared containing the amounts of ingredients listed in Table 18 below. The values in Table 18 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 18

Dry Concentrate according to Example 9

| Ingredient | Weight Percent of Each Ingredient in Dry Concentrate |
|---|---|
| DAP | 76.11% |
| Buffering Agent | 17.95% |
| Corrosion Inhibitor (approximately 40% water) | 0.54% |
| Thickening agent 1 - Polysaccharide gum | 2.51% |
| Red Iron Oxide | 0.25% |
| Fluorescent Pigment | 2.51% |
| Surfactant | 0.12% |
| Water | 0.00% |
| Total Weight of Dry Concentrate | 100% |

In Example 9, the final diluted product 103 was prepared by mixing approximately 1.35 pounds of the dry concentrate in 1 gallon of water. The amounts of the ingredients in the Example 9 final diluted product 103 are listed in Table 19 below. The values in Table 19 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 9 final diluted product 103 is about 5% to 20% by weight in water, preferably about 6% to 18%, more preferably about 7% to 16%. For example, the weight percent of salt in the Example 9 final diluted product 103 is about 10.6%±1.0%.

TABLE 19

Final Diluted Product according to Example 9

| Ingredient | Weight Percent of Each Ingredient in Final Diluted Product |
|---|---|
| DAP | 10.600% |
| Buffering Agent | 2.500% |
| Corrosion Inhibitor (approximately 40% water) | 0.075% |
| Thickening agent 1 - Polysaccharide gum | 0.350% |
| Red Iron Oxide | 0.035% |
| Fluorescent Pigment | 0.350% |
| Surfactant | 0.017% |
| Water | 86.073% |
| Total Weight of Final Diluted Product | 100% |

The density of the final diluted product 103 of Example 9 may be in the range of about 0.8 g/mL to about 1.3 g/mL, for example about 1.0 g/mL to about 1.2 g/mL. The pH of the final diluted product 103 of Example 9 may be in the range of about 5.5 to about 6.5, for example about 6.26. The N/P molar ratio of the final diluted product 103 of Example 9 may be in the range of about 1.5 to about 2.5, for example about 2.0. The ionic molarity of the final diluted product 103 of Example 9 may be in the range of about 1.5 to about 2.5, for example about 2.3.

Example 10

In Example 10, a dry concentrate was prepared containing the amounts of ingredients listed in Table 20 below. The values in Table 20 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 20

Dry Concentrate according to Example 10

| Ingredient | Weight Percent of Each Ingredient in Dry Concentrate |
|---|---|
| MAP | 77.75% |
| Buffering Agent | 15.48% |
| Corrosion Inhibitor (approximately 40% water) | 0.61% |
| Thickening agent 1 - Polysaccharide gum | 2.86% |
| Red Iron Oxide | 0.29% |
| Fluorescent Pigment | 2.86% |
| Surfactant | 0.14% |
| Water | 0.00% |
| Total Weight of Dry Concentrate | 100% |

In Example 10, the final diluted product 103 was prepared by mixing approximately 1.16 pounds of the dry concentrate in 1 gallon of water. The amounts of the ingredients in the Example 10 final diluted product 103 are listed in Table 21 below. The values in Table 21 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 10 final diluted product 103 is about 5% to 20% by weight in water, preferably about 6% to 18%, more preferably about 7% to 16%. For example, the weight percent of salt in the Example 10 final diluted product 103 is about 9.5%±1.0%.

TABLE 21

Final Diluted Product according to Example 10

| Ingredient | Weight Percent of Each Ingredient in Final Diluted Product |
|---|---|
| MAP | 9.500% |
| Buffering Agent | 1.892% |
| Corrosion Inhibitor (approximately 40% water) | 0.075% |
| Thickening agent 1 - Polysaccharide gum | 0.350% |
| Red Iron Oxide | 0.035% |
| Fluorescent Pigment | 0.350% |
| Surfactant | 0.017% |
| Water | 87.781% |
| Total Weight of Final Diluted Product | 100% |

The density of the final diluted product 103 of Example 10 may be in the range of about 0.8 g/mL to about 1.3 g/mL, for example about 1.0 g/mL to about 1.2 g/mL. The pH of the final diluted product 103 of Example 10 may be in the range of about 5.5 to about 6.5, for example about 6.23. The N/P molar ratio of the final diluted product 103 of Example 10 may be in the range of about 0.5 to about 1.5, for example about 1.0. The ionic molarity of the final diluted product 103 of Example 10 may be in the range of about 1.5 to about 2.5, for example about 2.1.

Example 11

In Example 11, a liquid concentrate was prepared containing the amounts of ingredients listed in Table 22 below. The values in Table 22 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 22

Liquid Concentrate according to Example 11

| Ingredient | Weight Percent of Each Ingredient in Liquid Concentrate |
|---|---|
| MAP | 42.90% |
| Buffering Agent | 13.55% |
| Corrosion Inhibitor (approximately 40% water) | 0.34% |
| Thickening agent 1 - Polysaccharide gum | 1.58% |
| Red Iron Oxide | 0.16% |
| Fluorescent Pigment | 1.58% |
| Surfactant | 0.08% |
| Water | 39.82% |
| Total Weight of Liquid Concentrate | 100% |

In Example 11, the final diluted product 202 was prepared by mixing approximately 1.37 pounds of the liquid concentrate in 1 gallon of water. The amounts of the ingredients in the Example 11 final diluted product 202 are listed in Table 23 below. The values in Table 23 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 11 final diluted product 202 is about 5% to 20% by weight in water, preferably about 6% to 18%, more preferably about 7% to 16%. For example, the weight percent of salt in the Example 11 final diluted product 202 is about 9.5%±1.0%.

TABLE 23

Final Diluted Product according to Example 11

| Ingredient | Weight Percent of Each Ingredient in Final Diluted Product |
|---|---|
| MAP | 9.500% |
| Buffering Agent | 3.000% |
| Corrosion Inhibitor (approximately 40% water) | 0.075% |
| Thickening agent 1 - Polysaccharide gum | 0.350% |
| Red Iron Oxide | 0.035% |
| Fluorescent Pigment | 0.350% |
| Surfactant | 0.017% |
| Water | 86.673% |
| Total Weight of Final Diluted Product | 100% |

The density of the final diluted product 202 of Example 11 may be in the range of about 0.8 g/mL to about 1.3 g/mL, for example about 1.0 g/mL to about 1.2 g/mL. The pH of the final diluted product 202 of Example 11 may be in the range of about 5.5 to about 6.5, for example about 6.22. The viscosity of the final diluted product 202 of Example 11 may be in the range of about 250 cP to about 450 cP, for example about 300 cP to about 400 cP. The N/P molar ratio of the final diluted product 202 of Example 11 may be in the range of about 0.5 to about 1.5, for example about 1.0. The ionic molarity of the final diluted product 202 of Example 11 may be in the range of about 1.5 to about 2.5, for example about 2.1.

Example 12

In Example 12, a dry concentrate was prepared containing the amounts of ingredients listed in Table 24 below. The values in Table 24 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 24

Dry Concentrate according to Example 12

| Ingredient | Weight Percent of Each Ingredient in Dry Concentrate |
|---|---|
| MAP | 48.92% |
| DAP | 21.42% |
| DSP | 22.96% |
| Corrosion Inhibitor (approximately 40% water) | 0.77% |
| Thickening agent 1 - Polysaccharide gum | 3.18% |
| Red Iron Oxide | 0.32% |
| Fluorescent Pigment | 2.27% |
| Surfactant | 0.15% |
| Water | 0.00% |
| Total Weight of Dry Concentrate | 100% |

In Example 12, the final diluted product 103 was prepared by mixing approximately 1.03 pounds of the dry concentrate in 1 gallon of water. The amounts of the ingredients in the Example 12 final diluted product 103 are listed in Table 25 below. The values in Table 25 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 12 final diluted product 103 is about 5% to 20% by weight in water, preferably about 6% to 18%, more preferably about 7% to 16%. For example, the weight percent of salt in the Example 12 final diluted product 103 is about 10.3%±1.0%.

TABLE 25

Final Diluted Product according to Example 12

| Ingredient | Weight Percent of Each Ingredient in Final Diluted Product |
|---|---|
| MAP | 5.39% |
| DAP | 2.36% |
| DSP | 2.53% |
| Corrosion Inhibitor (approximately 40% water) | 0.09% |
| Thickening agent 1 - Polysaccharide gum | 0.35% |
| Red Iron Oxide | 0.04% |
| Fluorescent Pigment | 0.25% |
| Surfactant | 0.02% |
| Water | 88.983% |
| Total Weight of Final Diluted Product | 100% |

The density of the final diluted product 103 of Example 12 may be in the range of about 0.7 g/mL to about 1.3 g/mL, for example about 0.8 g/mL to about 1.2 g/mL. The pH of the final diluted product 103 of Example 12 may be in the range of about 5.5 to about 6.5, for example about 6.23. The viscosity of the final diluted product 103 of Example 12 may be in the range of about 200 cP to about 400 cP, for example about 250 cP to about 350 cP. The N/P molar ratio of the final diluted product 103 of Example 12 may be in the range of about 0.8 to about 1.1, for example about 1. The ionic molarity of the final diluted product 103 of Example 12 may be in the range of about 1.5 to about 2.5, for example about 2.1.

Example 13

In Example 13, a dry concentrate was prepared containing the amounts of ingredients listed in Table 26 below. The values in Table 26 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 26

Dry Concentrate according to Example 13

| Ingredient | Weight Percent of Each Ingredient in Dry Concentrate |
|---|---|
| DAP | 41.45% |
| Buffering Agent | 7.61% |
| DSP | 44.57% |
| Corrosion Inhibitor (approximately 40% water) | 0.65% |
| Thickening agent 1 - Polysaccharide gum | 2.66% |
| Red Iron Oxide | 0.27% |
| Fluorescent Pigment | 2.66% |
| Surfactant | 0.13% |
| Water | 0.00% |
| Total Weight of Dry Concentrate | 100% |

In Example 13, the final diluted product 103 was prepared by mixing approximately 1.26 pounds of the dry concentrate in 1 gallon of water. The amounts of the ingredients in the Example 13 final diluted product 103 are listed in Table 27 below. The values in Table 27 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 13 final diluted product 103 is about 5% to 20% by weight in water, preferably about 6% to 18%, more preferably about 7% to 16%. For example, the weight percent of salt in the Example 13 final diluted product 103 is about 11.31%±1.0%.

TABLE 27

Final Diluted Product according to Example 13

| Ingredient | Weight Percent of Each Ingredient in Final Diluted Product |
|---|---|
| DAP | 5.45% |
| Buffering Agent | 1.00% |
| DSP | 5.86% |
| Corrosion Inhibitor (approximately 40% water) | 0.09% |
| Thickening agent 1 - Polysaccharide gum | 0.35% |
| Red Iron Oxide | 0.04% |
| Fluorescent Pigment | 0.35% |
| Surfactant | 0.02% |
| Water | 86.853% |
| Total Weight of Final Diluted Product | 100% |

The density of the final diluted product 103 of Example 13 may be in the range of about 0.8 g/mL to about 1.4 g/mL, for example about 1.0 g/mL to about 1.3 g/mL. The pH of the final diluted product 103 of Example 13 may be in the range of about 6.5 to about 7.5, for example about 7.14. The viscosity of the final diluted product 103 of Example 13 may be in the range of about 250 cP to about 450 cP, for example about 300 cP to about 400 cP. The N/P molar ratio of the final diluted product 103 of Example 13 may be in the range of about 0.8 to about 1.1, for example about 1. The ionic molarity of the final diluted product 103 of Example 13 may be in the range of about 2.5 to about 3.5, for example about 2.9.

Example 14

In Example 14, a dry concentrate was prepared containing the amounts of ingredients listed in Table 28 below. The values in Table 28 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 28

Dry Concentrate according to Example 14

| Ingredient | Weight Percent of Each Ingredient in Dry Concentrate |
|---|---|
| MAP | 49.84% |
| DAP | 21.82% |
| DSP | 23.39% |
| Corrosion Inhibitor (approximately 40% water) | 0.79% |
| Thickening agent 1 - Polysaccharide gum | 3.24% |
| Surfactant | 0.92% |
| Water | 0.00% |
| Total Weight of Dry Concentrate | 100% |

In Example 14, the final diluted product 103 was prepared by mixing approximately 1.01 pounds of the dry concentrate in 1 gallon of water. The amounts of the ingredients in the Example 14 final diluted product 103 are listed in Table 29 below. The values in Table 29 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 14 final diluted product 103 is about 5% to 20% by weight in water, preferably about 6% to 18%, more preferably about 7% to 16%. For example, the weight percent of salt in the Example 14 final diluted product 103 is about 10.28%±1.0%.

TABLE 29

Final Diluted Product according to Example 14

| Ingredient | Weight Percent of Each Ingredient in Final Diluted Product |
|---|---|
| MAP | 5.39% |
| DAP | 2.36% |
| DSP | 2.53% |
| Corrosion Inhibitor (approximately 40% water) | 0.09% |
| Thickening agent 1 - Polysaccharide gum | 0.35% |
| Surfactant | 0.10% |
| Water | 89.185% |
| Total Weight of Final Diluted Product | 100% |

The density of the final diluted product 103 of Example 14 may be in the range of about 0.7 g/mL to about 1.3 g/mL, for example about 0.8 g/mL to about 1.2 g/mL. The pH of the final diluted product 103 of Example 14 may be in the range of about 5.5 to about 6.5, for example about 6.24. The viscosity of the final diluted product 103 of Example 14 may be in the range of about 200 cP to about 400 cP, for example about 250 cP to about 350 cP. The N/P molar ratio of the final diluted product 103 of Example 14 may be in the range of about 0.8 to about 1.1, for example about 1. The ionic molarity of the final diluted product 103 of Example 14 may be in the range of about 1.5 to about 2.5, for example about 2.1.

Example 15

In Example 15, a dry concentrate was prepared containing the amounts of ingredients listed in Table 30 below. The values in Table 30 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 30

Dry Concentrate according to Example 15

| Ingredient | Weight Percent of Each Ingredient in Dry Concentrate |
|---|---|
| MAP | 43.70% |
| Ammonium Sulfate | 16.05% |
| DSP | 34.44% |
| Corrosion Inhibitor (approximately 40% water) | 0.83% |
| Thickening agent 1 - Polysaccharide gum | 2.64% |
| Red Iron Oxide | 0.30% |
| Fluorescent Pigment | 1.88% |
| Surfactant | 0.15% |
| Water | 0.00% |
| Total Weight of Dry Concentrate | 100% |

In Example 15, the final diluted product 103 was prepared by mixing approximately 1.28 pounds of the dry concentrate in 1 gallon of water. The amounts of the ingredients in the Example 15 final diluted product 103 are listed in Table 31 below. The values in Table 31 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 15 final diluted product 103 is about 5% to 20% by weight in water, preferably about 6% to 18%, more preferably about 7% to 16%. For example, the weight percent of salt in the Example 15 final diluted product 103 is about 12.5%±1.0%.

TABLE 31

Final Diluted Product according to Example 15

| Ingredient | Weight Percent of Each Ingredient in Final Diluted Product |
|---|---|
| MAP | 5.80% |
| Ammonium Sulfate | 2.13% |
| DSP | 4.57% |
| Corrosion Inhibitor (approximately 40% water) | 0.11% |
| Thickening agent 1 - Polysaccharide gum | 0.35% |
| Red Iron Oxide | 0.04% |
| Fluorescent Pigment | 0.25% |
| Surfactant | 0.02% |
| Water | 86.732% |
| Total Weight of Final Diluted Product | 100% |

The density of the final diluted product 103 of Example 15 may be in the range of about 0.7 g/mL to about 1.3 g/mL, for example about 0.8 g/mL to about 1.2 g/mL. The pH of the final diluted product 103 of Example 15 may be in the range of about 5.5 to about 6.5, for example about 6.15. The viscosity of the final diluted product 103 of Example 15 may be in the range of about 200 cP to about 400 cP, for example about 250 cP to about 350 cP. The N/P molar ratio of the final diluted product 103 of Example 15 may be in the range of about 0.5 to about 1.5, for example about 1.0. The ionic molarity of the final diluted product 103 of Example 15 may be in the range of about 2.0 to about 3.0, for example about 2.7.

Example 16

In Example 16, a dry concentrate was prepared containing the amounts of ingredients listed in Table 32 below. The values in Table 32 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 32

Dry Concentrate according to Example 16

| Ingredient | Weight Percent of Each Ingredient in Dry Concentrate |
|---|---|
| MAP | 45.09% |
| Ammonium Chloride | 13.38% |
| DSP | 35.54% |
| Corrosion Inhibitor (approximately 40% water) | 0.86% |
| Thickening agent 1 - Polysaccharide gum | 2.72% |
| Red Iron Oxide | 0.31% |
| Fluorescent Pigment | 1.94% |
| Surfactant | 0.16% |
| Water | 0.00% |
| Total Weight of Dry Concentrate | 100% |

In Example 16, the final diluted product 103 was prepared by mixing approximately 1.23 pounds of the dry concentrate in 1 gallon of water. The amounts of the ingredients in the Example 16 final diluted product 103 are listed in Table 33 below. The values in Table 33 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 16 final diluted product 103 is about 5% to 20% by weight in water, preferably about 6% to 18%, more preferably about 7% to 16%. For example, the weight percent of salt in the Example 16 final diluted product 103 is about 12.1%±1.0%.

TABLE 33

Final Diluted Product according to Example 16

| Ingredient | Weight Percent of Each Ingredient in Final Diluted Product |
|---|---|
| MAP | 5.80% |
| Ammonium Chloride | 1.72% |
| DSP | 4.57% |
| Corrosion Inhibitor (approximately 40% water) | 0.11% |
| Thickening agent 1 - Polysaccharide gum | 0.35% |
| Red Iron Oxide | 0.04% |
| Fluorescent Pigment | 0.25% |
| Surfactant | 0.02% |
| Water | 87.142% |
| Total Weight of Final Diluted Product | 100% |

The density of the final diluted product 103 of Example 16 may be in the range of about 0.7 g/mL to about 1.3 g/mL, for example about 0.8 g/mL to about 1.2 g/mL. The pH of the final diluted product 103 of Example 16 may be in the range of about 5.5 to about 6.5, for example about 6.08. The viscosity of the final diluted product 103 of Example 16 may be in the range of about 200 cP to about 400 cP, for example about 250 cP to about 350 cP. The N/P molar ratio of the final diluted product 103 of Example 16 may be in the range of about 0.5 to about 1.5, for example about 1.0. The ionic molarity of the final diluted product 103 of Example 16 may be in the range of about 2.5 to about 3.5, for example about 2.8.

Example 17

In Example 17, a dry concentrate was prepared containing the amounts of ingredients listed in Table 34 below. The values in Table 34 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 34

Dry Concentrate according to Example 17

| Ingredient | Weight Percent of Each Ingredient in Dry Concentrate |
|---|---|
| DAP | 48.79% |
| Monosodium Phosphate | 44.32% |
| Corrosion Inhibitor (approximately 40% water) | 0.98% |
| Thickening agent 1 - Polysaccharide gum | 3.13% |
| Red Iron Oxide | 0.36% |
| Fluorescent Pigment | 2.24% |
| Surfactant | 0.18% |
| Water | 0.00% |
| Total Weight of Dry Concentrate | 100% |

In Example 17, the final diluted product 103 was prepared by mixing approximately 1.05 pounds of the dry concentrate in 1 gallon of water. The amounts of the ingredients in the Example 17 final diluted product 103 are listed in Table 35 below. The values in Table 35 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 17 final diluted product 103 is about 5% to 20% by weight in water, preferably about 6% to 18%, more preferably about 7% to 16%. For example, the weight percent of salt in the Example 17 final diluted product 103 is about 10.4%±1.0%.

TABLE 35

Final Diluted Product according to Example 17

| Ingredient | Weight Percent of Each Ingredient in Final Diluted Product |
|---|---|
| DAP | 5.45% |
| Monosodium Phosphate | 4.95% |
| Corrosion Inhibitor (approximately 40% water) | 0.11% |
| Thickening agent 1 - Polysaccharide gum | 0.35% |
| Red Iron Oxide | 0.04% |
| Fluorescent Pigment | 0.25% |
| Surfactant | 0.02% |
| Water | 88.830% |
| Total Weight of Final Diluted Product | 100% |

The density of the final diluted product 103 of Example 17 may be in the range of about 0.7 g/mL to about 1.3 g/mL, for example about 0.8 g/mL to about 1.2 g/mL. The pH of the final diluted product 103 of Example 17 may be in the range of about 6.0 to about 7.0, for example about 6.5. The viscosity of the final diluted product 103 of Example 17 may be in the range of about 200 cP to about 400 cP, for example about 250 cP to about 350 cP. The N/P molar ratio of the final diluted product 103 of Example 17 may be in the range of about 0.5 to about 1.5, for example about 1.0. The ionic molarity of the final diluted product 103 of Example 17 may be in the range of about 1.5 to about 2.5, for example about 2.1.

Example 18

In Example 18, a dry concentrate was prepared containing the amounts of ingredients listed in Table 36 below. The values in Table 36 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 36

Dry Concentrate according to Example 18

| Ingredient | Weight Percent of Each Ingredient in Dry Concentrate |
|---|---|
| DAP | 46.58% |
| Monosodium Phosphate | 42.31% |
| Citric Acid | 4.53% |
| Corrosion Inhibitor (approximately 40% water) | 0.94% |
| Thickening agent 1 - Polysaccharide gum | 2.99% |
| Red Iron Oxide | 0.34% |
| Fluorescent Pigment | 2.14% |

TABLE 36-continued

Dry Concentrate according to Example 18

| Ingredient | Weight Percent of Each Ingredient in Dry Concentrate |
|---|---|
| Surfactant | 0.17% |
| Water | 0.00% |
| Total Weight of Dry Concentrate | 100% |

In Example 18, the final diluted product 103 was prepared by mixing approximately 1.11 pounds of the dry concentrate in 1 gallon of water. The amounts of the ingredients in the Example 18 final diluted product 103 are listed in Table 37 below. The values in Table 37 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 18 final diluted product 103 is about 5% to 20% by weight in water, preferably about 6% to 18%, more preferably about 7% to 16%. For example, the weight percent of salt in the Example 18 final diluted product 103 is about 10.4%±1.0%.

TABLE 37

Final Diluted Product according to Example 18

| Ingredient | Weight Percent of Each Ingredient in Final Diluted Product |
|---|---|
| DAP | 5.45% |
| Monosodium Phosphate | 4.95% |
| Citric Acid | 0.53% |
| Corrosion Inhibitor (approximately 40% water) | 0.11% |
| Thickening agent 1 - Polysaccharide gum | 0.35% |
| Red Iron Oxide | 0.04% |
| Fluorescent Pigment | 0.25% |
| Surfactant | 0.02% |
| Water | 88.300% |
| Total Weight of Final Diluted Product | 100% |

The density of the final diluted product 103 of Example 18 may be in the range of about 0.7 g/mL to about 1.3 g/mL, for example about 0.8 g/mL to about 1.2 g/mL. The pH of the final diluted product 103 of Example 18 may be in the range of about 5.5 to about 6.5, for example about 6.24. The viscosity of the final diluted product 103 of Example 18 may be in the range of about 200 cP to about 400 cP, for example about 250 cP to about 350 cP. The N/P molar ratio of the final diluted product 103 of Example 18 may be in the range of about 0.5 to about 1.5, for example about 1.0. The ionic molarity of the final diluted product 103 of Example 18 may be in the range of about 1.5 to about 2.5, for example about 2.3.

Example 19

In Example 19, a dry concentrate was prepared containing the amounts of ingredients listed in Table 38 below. The values in Table 38 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 38

Dry Concentrate according to Example 19

| Ingredient | Weight Percent of Each Ingredient in Dry Concentrate |
|---|---|
| MAP | 52.53% |
| DSP | 43.22% |
| Corrosion Inhibitor (approximately 40% water) | 0.61% |
| Thickening agent 1 - Polysaccharide gum | 1.94% |
| Red Iron Oxide | 0.22% |
| Fluorescent Pigment | 1.38% |
| Surfactant | 0.11% |
| Water | 0.00% |
| Total Weight of Dry Concentrate | 100% |

In Example 19, the final diluted product 103 was prepared by mixing approximately 1.84 pounds of the dry concentrate in 1 gallon of water. The amounts of the ingredients in the Example 19 final diluted product 103 are listed in Table 39 below. The values in Table 39 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 19 final diluted product 103 is about 5% to 25% by weight in water, preferably about 6% to 23%, more preferably about 7% to 20%. For example, the weight percent of salt in the Example 19 final diluted product 103 is about 17.3%±1.0%.

TABLE 39

Final Diluted Product according to Example 19

| Ingredient | Weight Percent of Each Ingredient in Final Diluted Product |
|---|---|
| MAP | 9.50% |
| DSP | 7.82% |
| Corrosion Inhibitor (approximately 40% water) | 0.11% |
| Thickening agent 1 - Polysaccharide gum | 0.35% |
| Red Iron Oxide | 0.04% |
| Fluorescent Pigment | 0.25% |
| Surfactant | 0.02% |
| Water | 81.914% |
| Total Weight of Final Diluted Product | 100% |

The density of the final diluted product 103 of Example 19 may be in the range of about 0.7 g/mL to about 1.3 g/mL, for example about 0.8 g/mL to about 1.2 g/mL. The pH of the final diluted product 103 of Example 19 may be in the range of about 5.5 to about 6.5, for example about 6.11. The viscosity of the final diluted product 103 of Example 19 may be in the range of about 250 cP to about 450 cP, for example about 300 cP to about 400 cP. The N/P molar ratio of the final diluted product 103 of Example 19 may be in the range of about 0.4 to about 1.0, for example about 0.6. The ionic molarity of the final diluted product 103 of Example 19 may be in the range of about 3.0 to about 4.0, for example about 3.7.

Example 20

In Example 20, a dry concentrate was prepared containing the amounts of ingredients listed in Table 40 below. The values in Table 40 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 40

Dry Concentrate according to Example 20

| Ingredient | Weight Percent of Each Ingredient in Dry Concentrate |
|---|---|
| MAP | 71.27% |
| DSP | 22.96% |
| Corrosion Inhibitor (approximately 40% water) | 0.83% |
| Thickening agent 1 - Polysaccharide gum | 2.63% |
| Red Iron Oxide | 0.30% |
| Fluorescent Pigment | 1.88% |
| Surfactant | 0.15% |
| Water | 0.00% |
| Total Weight of Dry Concentrate | 100% |

In Example 20, the final diluted product 103 was prepared by mixing approximately 1.28 pounds of the dry concentrate in 1 gallon of water. The amounts of the ingredients in the Example 20 final diluted product 103 are listed in Table 41 below. The values in Table 41 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 20 final diluted product 103 is about 5% to 20% by weight in water, preferably about 6% to 18%, more preferably about 7% to 16%. For example, the weight percent of salt in the Example 20 final diluted product 103 is about 12.56%±1.0%.

TABLE 41

Final Diluted Product according to Example 20

| Ingredient | Weight Percent of Each Ingredient in Final Diluted Product |
|---|---|
| MAP | 9.50% |
| DSP | 3.06% |
| Corrosion Inhibitor (approximately 40% water) | 0.11% |
| Thickening agent 1 - Polysaccharide gum | 0.35% |
| Red Iron Oxide | 0.04% |
| Fluorescent Pigment | 0.25% |
| Surfactant | 0.02% |
| Water | 86.670% |
| Total Weight of Final Diluted Product | 100% |

The density of the final diluted product 103 of Example 20 may be in the range of about 0.7 g/mL to about 1.3 g/mL, for example about 0.8 g/mL to about 1.2 g/mL. The pH of the final diluted product 103 of Example 20 may be in the range of about 5.0 to about 6.0, for example about 5.65. The viscosity of the final diluted product 103 of Example 20 may be in the range of about 250 cP to about 450 cP, for example about 300 cP to about 400 cP. The N/P molar ratio of the final diluted product 103 of Example 20 may be in the range of about 0.4 to about 1.0, for example about 0.79. The ionic molarity of the final diluted product 103 of Example 20 may be in the range of about 2.0 to about 3.0, for example about 2.5.

Example 21

In Example 21, a dry concentrate was prepared containing the amounts of ingredients listed in Table 42 below. The values in Table 42 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 42

Dry Concentrate according to Example 21

| Ingredient | Weight Percent of Each Ingredient in Dry Concentrate |
|---|---|
| DAP | 37.82% |
| Dipotassium phosphate | 49.90% |
| Citric Acid | 6.94% |
| Corrosion Inhibitor (approximately 40% water) | 0.76% |
| Thickening agent 1 - Polysaccharide gum | 2.43% |
| Red Iron Oxide | 0.28% |
| Fluorescent Pigment | 1.73% |
| Surfactant | 0.14% |
| Water | 0.00% |
| Total Weight of Dry Concentrate | 100% |

In Example 21, the final diluted product 103 was prepared by mixing approximately 1.41 pounds of the dry concentrate in 1 gallon of water. The amounts of the ingredients in the Example 21 final diluted product 103 are listed in Table 43 below. The values in Table 43 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 21 final diluted product 103 is about 5% to 20% by weight in water, preferably about 6% to 18%, more preferably about 7% to 16%. For example, the weight percent of salt in the Example 21 final diluted product 103 is about 12.64%±1.0%.

TABLE 43

Final Diluted Product according to Example 21

| Ingredient | Weight Percent of Each Ingredient in Final Diluted Product |
|---|---|
| DAP | 5.45% |
| Dipotassium phosphate | 7.19% |
| Citric Acid | 1.00% |
| Corrosion Inhibitor (approximately 40% water) | 0.11% |
| Thickening agent 1 - Polysaccharide gum | 0.35% |
| Red Iron Oxide | 0.04% |
| Fluorescent Pigment | 0.25% |
| Surfactant | 0.02% |
| Water | 85.590% |
| Total Weight of Final Diluted Product | 100% |

The density of the final diluted product 103 of Example 21 may be in the range of about 0.7 g/mL to about 1.3 g/mL, for example about 0.8 g/mL to about 1.2 g/mL. The pH of the final diluted product 103 of Example 21 may be in the range of about 7.0 to about 8.0, for example about 7.4. The viscosity of the final diluted product 103 of Example 21 may be in the range of about 250 cP to about 450 cP, for example about 300 cP to about 400 cP. The N/P molar ratio of the final diluted product 103 of Example 21 may be in the range of about 0.5 to about 1.5, for example about 0.9. The ionic molarity of the final diluted product 103 of Example 21 may be in the range of about 3.0 to about 4.0, for example about 3.2.

Example 22

In Example 22, a dry concentrate was prepared containing the amounts of ingredients listed in Table 44 below. The values in Table 44 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 44

Dry Concentrate according to Example 22

| Ingredient | Weight Percent of Each Ingredient in Dry Concentrate |
|---|---|
| Ammonium chloride | 27.83% |
| DSP | 31.74% |
| MSP | 35.58% |
| Corrosion Inhibitor (approximately 40% water) | 0.69% |
| Thickening agent 1 - Polysaccharide gum | 2.20% |
| Red Iron Oxide | 0.25% |
| Fluorescent Pigment | 1.57% |
| Surfactant | 0.13% |
| Water | 0.00% |
| Total Weight of Dry Concentrate | 100% |

In Example 22, the final diluted product 103 was prepared by mixing approximately 1.58 pounds of the dry concentrate in 1 gallon of water. The amounts of the ingredients in the Example 22 final diluted product 103 are listed in Table 45 below. The values in Table 45 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 22 final diluted product 103 is about 5% to 25% by weight in water, preferably about 6% to 20%, more preferably about 7% to 18%. For example, the weight percent of salt in the Example 22 final diluted product 103 is about 15.1%±1.0%.

TABLE 45

Final Diluted Product according to Example 22

| Ingredient | Weight Percent of Each Ingredient in Final Diluted Product |
|---|---|
| Ammonium chloride | 4.42% |
| DSP | 5.04% |
| MSP | 5.65% |
| Corrosion Inhibitor (approximately 40% water) | 0.11% |
| Thickening agent 1 - Polysaccharide gum | 0.35% |
| Red Iron Oxide | 0.04% |
| Fluorescent Pigment | 0.25% |
| Surfactant | 0.02% |
| Water | 84.120% |
| Total Weight of Final Diluted Product | 100% |

The density of the final diluted product 103 of Example 22 may be in the range of about 0.7 g/mL to about 1.5 g/mL, for example about 0.8 g/mL to about 1.4 g/mL. The pH of the final diluted product 103 of Example 22 may be in the range of about 5.5 to about 6.5, for example about 6.0. The viscosity of the final diluted product 103 of Example 22 may be in the range of about 250 cP to about 450 cP, for example about 300 cP to about 400 cP. The N/P molar ratio of the final diluted product 103 of Example 22 may be in the range of about 0.5 to about 1.5, for example about 1. The ionic molarity of the final diluted product 103 of Example 22 may be in the range of about 3.5 to about 4.5, for example about 3.9.

Example 23

In Example 23, a dry concentrate was prepared containing the amounts of ingredients listed in Table 46 below. The values in Table 46 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 46

Dry Concentrate according to Example 23

| Ingredient | Weight Percent of Each Ingredient in Dry Concentrate |
|---|---|
| Ammonium citrate | 42.78% |
| DSP | 53.70% |
| Corrosion Inhibitor (approximately 40% water) | 0.50% |
| Thickening agent 1 - Polysaccharide gum | 1.60% |
| Red Iron Oxide | 0.18% |
| Fluorescent Pigment | 1.15% |
| Surfactant | 0.09% |
| Water | 0.00% |
| Total Weight of Dry Concentrate | 100% |

In Example 23, the final diluted product 103 was prepared by mixing approximately 2.33 pounds of the dry concentrate in 1 gallon of water. The amounts of the ingredients in the Example 23 final diluted product 103 are listed in Table 47 below. The values in Table 47 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 23 final diluted product 103 is about 10% to 35% by weight in water, preferably about 12% to 30%, more preferably about 14% to 28%. For example, the weight percent of salt in the Example 23 final diluted product 103 is about 21.1%±1.0%.

TABLE 47

Final Diluted Product according to Example 23

| Ingredient | Weight Percent of Each Ingredient in Final Diluted Product |
|---|---|
| Ammonium citrate | 9.34% |
| DSP | 11.72% |
| Corrosion Inhibitor (approximately 40% water) | 0.11% |
| Thickening agent 1 - Polysaccharide gum | 0.35% |
| Red Iron Oxide | 0.04% |
| Fluorescent Pigment | 0.25% |
| Surfactant | 0.02% |
| Water | 78.166% |
| Total Weight of Final Diluted Product | 100% |

The density of the final diluted product 103 of Example 23 may be in the range of about 0.7 g/mL to about 1.5 g/mL, for example about 0.8 g/mL to about 1.4 g/mL. The pH of the final diluted product 103 of Example 23 may be in the range of about 6.0 to about 7.0, for example about 6.3. The viscosity of the final diluted product 103 of Example 23 may be in the range of about 300 cP to about 500 cP, for example about 350 cP to about 450 cP. The N/P molar ratio of the final diluted product 103 of Example 23 may be in the range of about 0.5 to about 1.5, for example about 1. The ionic molarity of the final diluted product 103 of Example 23 may be in the range of about 4.0 to about 5.0, for example about 4.5.

Example 24

In Example 24, a dry concentrate was prepared containing the amounts of ingredients listed in Table 48 below. The values in Table 48 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 48

Dry Concentrate according to Example 24

| Ingredient | Weight Percent of Each Ingredient in Dry Concentrate |
|---|---|
| DAP | 48.31% |
| MSP | 43.92% |
| Corrosion Inhibitor (approximately 40% water) | 1.01% |
| Thickening agent 1 - Polysaccharide gum | 3.20% |
| Red Iron Oxide | 0.37% |
| Fluorescent Pigment | 2.29% |
| Surfactant | 0.91% |
| Water | 0.00% |
| Total Weight of Dry Concentrate | 100% |

In Example 24, the final diluted product 103 was prepared by mixing approximately 1.02 pounds of the dry concentrate in 1 gallon of water. The amounts of the ingredients in the Example 24 final diluted product 103 are listed in Table 49 below. The values in Table 49 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 24 final diluted product 103 is about 5% to 25% by weight in water, preferably about 6% to 20%, more preferably about 7% to 18%. For example, the weight percent of salt in the Example 24 final diluted product 103 is about 10.1%±1.0%.

TABLE 49

Final Diluted Product according to Example 24

| Ingredient | Weight Percent of Each Ingredient in Final Diluted Product |
|---|---|
| DAP | 5.28% |
| MSP | 4.80% |
| Corrosion Inhibitor (approximately 40% water) | 0.11% |
| Thickening agent 1 - Polysaccharide gum | 0.35% |
| Red Iron Oxide | 0.04% |
| Fluorescent Pigment | 0.25% |
| Surfactant | 0.10% |
| Water | 89.070% |
| Total Weight of Final Diluted Product | 100% |

The density of the final diluted product 103 of Example 24 may be in the range of about 0.7 g/mL to about 1.5 g/mL, for example about 0.8 g/mL to about 1.4 g/mL. The pH of the final diluted product 103 of Example 24 may be in the range of about 6.0 to about 7.0, for example about 6.5. The viscosity of the final diluted product 103 of Example 24 may be in the range of about 200 cP to about 400 cP, for example about 250 cP to about 350 cP. The N/P molar ratio of the final diluted product 103 of Example 24 may be in the range of about 0.5 to about 1.5, for example about 1. The ionic molarity of the final diluted product 103 of Example 24 may be in the range of about 1.5 to about 2.5, for example about 2.2.

Example 25

In Example 25, a dry concentrate was prepared containing the amounts of ingredients listed in Table 50 below. The values in Table 50 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 50

Dry Concentrate according to Example 25

| Ingredient | Weight Percent of Each Ingredient in Dry Concentrate |
|---|---|
| DAP | 47.52% |
| DSP | 12.73% |
| MSP | 32.35% |
| Corrosion Inhibitor (approximately 40% water) | 0.96% |
| Thickening agent 1 - Polysaccharide gum | 3.05% |
| Red Iron Oxide | 0.35% |
| Fluorescent Pigment | 2.18% |
| Surfactant | 0.87% |
| Water | 0.00% |
| Total Weight of Dry Concentrate | 100% |

In Example 25, the final diluted product 103 was prepared by mixing approximately 1.1 pounds of the dry concentrate in 1 gallon of water. The amounts of the ingredients in the Example 25 final diluted product 103 are listed in Table 51 below. The values in Table 51 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 25 final diluted product 103 is about 5% to 25% by weight in water, preferably about 6% to 20%, more preferably about 7% to 18%. For example, the weight percent of salt in the Example 25 final diluted product 103 is about 10.6%±1.0%.

TABLE 51

Final Diluted Product according to Example 25

| Ingredient | Weight Percent of Each Ingredient in Final Diluted Product |
|---|---|
| DAP | 5.45% |
| DSP | 1.46% |
| MSP | 3.71% |
| Corrosion Inhibitor (approximately 40% water) | 0.11% |
| Thickening agent 1 - Polysaccharide gum | 0.35% |
| Red Iron Oxide | 0.04% |
| Fluorescent Pigment | 0.25% |
| Surfactant | 0.10% |
| Water | 88.530% |
| Total Weight of Final Diluted Product | 100% |

The density of the final diluted product 103 of Example 25 may be in the range of about 0.7 g/mL to about 1.5 g/mL, for example about 0.8 g/mL to about 1.4 g/mL. The pH of the final diluted product 103 of Example 25 may be in the range of about 6.0 to about 7.0, for example about 6.8. The viscosity of the final diluted product 103 of Example 25 may be in the range of about 200 cP to about 400 cP, for example about 250 cP to about 350 cP. The N/P molar ratio of the final diluted product 103 of Example 25 may be in the range of about 0.5 to about 1.5, for example about 1. The ionic molarity of the final diluted product 103 of Example 25 may be in the range of about 1.5 to about 2.5, for example about 2.3.

Example 26

In Example 26, a dry concentrate was prepared containing the amounts of ingredients listed in Table 52 below. The values in Table 52 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 52

Dry Concentrate according to Example 26

| Ingredient | Weight Percent of Each Ingredient in Dry Concentrate |
|---|---|
| DAP | 47.06% |
| DSP | 12.61% |
| MSP | 32.04% |
| Corrosion Inhibitor (approximately 40% water) | 1.90% |
| Thickening agent 1 - Polysaccharide gum | 3.02% |
| Red Iron Oxide | 0.35% |
| Fluorescent Pigment | 2.16% |
| Surfactant | 0.86% |
| Water | 0.00% |
| Total Weight of Dry Concentrate | 100% |

In Example 26, the final diluted product 103 was prepared by mixing approximately 1.1 pounds of the dry concentrate in 1 gallon of water. The amounts of the ingredients in the Example 26 final diluted product 103 are listed in Table 53 below. The values in Table 53 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 26 final diluted product 103 is about 5% to 25% by weight in water, preferably about 6% to 20%, more preferably about 7% to 18%. For example, the weight percent of salt in the Example 26 final diluted product 103 is about 10.6%±1.0%.

TABLE 53

Final Diluted Product according to Example 26

| Ingredient | Weight Percent of Each Ingredient in Final Diluted Product |
|---|---|
| DAP | 5.45% |
| DSP | 1.46% |
| MSP | 3.71% |
| Corrosion Inhibitor (approximately 40% water) | 0.22% |
| Thickening agent 1 - Polysaccharide gum | 0.35% |
| Red Iron Oxide | 0.04% |
| Fluorescent Pigment | 0.25% |
| Surfactant | 0.10% |
| Water | 88.420% |
| Total Weight of Final Diluted Product | 100% |

The density of the final diluted product 103 of Example 26 may be in the range of about 0.7 g/mL to about 1.5 g/mL, for example about 0.8 g/mL to about 1.4 g/mL. The pH of the final diluted product 103 of Example 26 may be in the range of about 6.0 to about 7.0, for example about 6.8. The viscosity of the final diluted product 103 of Example 26 may be in the range of about 200 cP to about 400 cP, for example about 250 cP to about 350 cP. The N/P molar ratio of the final diluted product 103 of Example 26 may be in the range of about 0.5 to about 1.5, for example about 1. The ionic molarity of the final diluted product 103 of Example 26 may be in the range of about 1.5 to about 2.5, for example about 2.3.

Example 27

In Example 27, a dry concentrate was prepared containing the amounts of ingredients listed in Table 54 below. The values in Table 54 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 54

Dry Concentrate according to Example 27

| Ingredient | Weight Percent of Each Ingredient in Dry Concentrate |
|---|---|
| DAP | 47.72% |
| DSP | 12.78% |
| MSP | 32.49% |
| Corrosion Inhibitor (approximately 40% water) | 0.53% |
| Thickening agent 1 - Polysaccharide gum | 3.06% |
| Red Iron Oxide | 0.35% |
| Fluorescent Pigment | 2.19% |
| Surfactant | 0.88% |
| Water | 0.00% |
| Total Weight of Dry Concentrate | 100% |

In Example 27, the final diluted product 103 was prepared by mixing approximately 1.1 pounds of the dry concentrate in 1 gallon of water. The amounts of the ingredients in the Example 27 final diluted product 103 are listed in Table 55 below. The values in Table 55 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 27 final diluted product 103 is about 5% to 25% by weight in water, preferably about 6% to 20%, more preferably about 7% to 18%. For example, the weight percent of salt in the Example 27 final diluted product 103 is about 10.6%±1.0%.

TABLE 55

Final Diluted Product according to Example 27

| Ingredient | Weight Percent of Each Ingredient in Final Diluted Product |
|---|---|
| DAP | 5.45% |
| DSP | 1.46% |
| MSP | 3.71% |
| Corrosion Inhibitor (approximately 40% water) | 0.06% |
| Thickening agent 1 - Polysaccharide gum | 0.35% |
| Red Iron Oxide | 0.04% |
| Fluorescent Pigment | 0.25% |
| Surfactant | 0.10% |
| Water | 88.580% |
| Total Weight of Final Diluted Product | 100% |

The density of the final diluted product 103 of Example 27 may be in the range of about 0.7 g/mL to about 1.5 g/mL, for example about 0.8 g/mL to about 1.4 g/mL. The pH of the final diluted product 103 of Example 27 may be in the range of about 6.0 to about 7.0, for example about 6.8. The viscosity of the final diluted product 103 of Example 27 may be in the range of about 200 cP to about 400 cP, for example about 250 cP to about 350 cP. The N/P molar ratio of the final diluted product 103 of Example 27 may be in the range of about 0.5 to about 1.5, for example about 1. The ionic molarity of the final diluted product 103 of Example 27 may be in the range of about 1.5 to about 2.5, for example about 2.3.

Example 28

In Example 28, a dry concentrate was prepared containing the amounts of ingredients listed in Table 56 below. The values in Table 56 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 56

Dry Concentrate according to Example 28

| Ingredient | Weight Percent of Each Ingredient in Dry Concentrate |
|---|---|
| DAP | 46.58% |
| DSP | 25.04% |
| MSP | 21.11% |
| Corrosion Inhibitor (approximately 40% water) | 0.94% |
| Thickening agent 1 - Polysaccharide gum | 2.99% |
| Red Iron Oxide | 0.34% |
| Fluorescent Pigment | 2.14% |
| Surfactant | 0.85% |
| Water | 0.00% |
| Total Weight of Dry Concentrate | 100% |

In Example 28, the final diluted product 103 was prepared by mixing approximately 1.11 pounds of the dry concentrate in 1 gallon of water. The amounts of the ingredients in the Example 28 final diluted product 103 are listed in Table 57 below. The values in Table 57 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 28 final diluted product 103 is about 5% to 25% by weight in water, preferably about 6% to 20%, more preferably about 7% to 18%. For example, the weight percent of salt in the Example 28 final diluted product 103 is about 10.9%±1.0%.

TABLE 57

Final Diluted Product according to Example 28

| Ingredient | Weight Percent of Each Ingredient in Final Diluted Product |
|---|---|
| DAP | 5.45% |
| DSP | 2.93% |
| MSP | 2.47% |
| Corrosion Inhibitor (approximately 40% water) | 0.11% |
| Thickening agent 1 - Polysaccharide gum | 0.35% |
| Red Iron Oxide | 0.04% |
| Fluorescent Pigment | 0.25% |
| Surfactant | 0.10% |
| Water | 88.300% |
| Total Weight of Final Diluted Product | 100% |

The density of the final diluted product 103 of Example 28 may be in the range of about 0.7 g/mL to about 1.5 g/mL, for example about 0.8 g/mL to about 1.4 g/mL. The pH of the final diluted product 103 of Example 28 may be in the range of about 6.5 to about 7.5, for example about 7.1. The viscosity of the final diluted product 103 of Example 28 may be in the range of about 200 cP to about 400 cP, for example about 250 cP to about 350 cP. The N/P molar ratio of the final diluted product 103 of Example 28 may be in the range of about 0.5 to about 1.5, for example about 1. The ionic molarity of the final diluted product 103 of Example 28 may be in the range of about 2.0 to about 3.0, for example about 2.5.

Methods of Use

The forest fire retardant compositions of Examples 1-28 may be used to suppress, retard, or contain a forest fire.

Direct Attack

In a direct attack, the final diluted composition 103 and/or 202 is applied on the flame front. The final diluted composition 103 and/or 202 is a thickened water retardant which contains water to cool and suppress the fire.

Indirect Attack

In an indirect attack, the final diluted composition 103 and/or 202 is applied in fire containment lines at a significant distance from the fire line. The indirect fire lines are built, and the fire is allowed to burn into them. The long-term fire retardant must be effective even after the water in the composition has evaporated. In an indirect attack, the final diluted composition 103 and/or 202 is applied to vegetation. As the water in the final diluted composition 103 and/or 202 evaporates, the salt concentration increases until it reaches its saturation level.

Field Handling and Measurement

The forest fire retardant composition of Examples 1-10 and 12-28 can be delivered to the field either as the dry concentrate 101, liquid concentrate 102, or as the final diluted composition 103 and/or 202. The forest fire retardant composition of Example 11 can be delivered to the field either as the liquid concentrate 201 or as the final diluted composition 202. The final diluted compositions 103 and/or 202 of Examples 1-28 can be tested prior to application in the field to confirm proper salt content and/or proper N/P molar ratio. A refractometer can be used to test the salt content. Density can also be used to determine the salt content.

Field Mixing Procedures and Ratios

Batch preparation of final diluted composition 202 may be accomplished by slowly feeding the liquid concentrate into a well-stirred mix tank containing a predetermined amount of water. Mix tank agitation may be provided via an overhead mechanical stirring apparatus or alternatively by a circulation pump sized to provide turbulent mixing. Stir until the concentrate is uniformly mixed into the water. Alternatively, the final diluted composition 202 may be mixed using continuous mixing equipment.

Aerial Application

The final diluted composition 103 and/or 202 may be deposited via aerial application from an airplane or helicopter. The airplane may be a fixed-wing multi-engine aircraft, a fixed-wing single engine airtanker (SEAT), a large airtanker (LAT), a very large airtanker (VLAT), or an unmanned aircraft system (UAS). The helicopter may be a fixed-tank helicopter (HF) or it may be a helicopter bucket (HB). The final diluted composition 103 and/or 202 may be deposited in an indirect attack to build a retardant line before a forest fire or directly to a forest fire via aerial application.

Ground Application

The final diluted composition 103 and/or 202 may be deposited via ground application from a truck or ground engine (G). The final diluted composition 103 and/or 202 may be deposited in an indirect attack to build a retardant line before a forest fire or it may be deposited directly to a forest fire via ground application.

Clean Up Procedure

The dry concentrate 101 can be cleaned by broom and/or vacuum. The dry concentrate 101 should be kept dry during cleaning to minimize color staining that may occur when the dye is hydrated. When the dry concentrate 101 is exposed to water, the product can be cleaned with the use of a granular chemical absorbent material, or if proper drainage is available, by rinsing surfaces clean with adequate amounts of water. Dye coloration may be removed from surfaces by treatment with liquid or dry detergent. The final diluted composition 103 can be cleaned with soap or liquid detergent and water. The color of the dye can be neutralized by sodium hypochlorite or washed with liquid detergent.

The liquid concentrate 201 can be cleaned by flushing with water and capturing the rinse in a tank or disposal container via drains. The liquid concentrate 201 and the final diluted composition 202 can be cleaned with soap or liquid detergent and water. The color of the dye can be neutralized by a bleaching agent such as sodium hypochlorite or washed with liquid detergent.

Corrosion Testing

In a preferred embodiment, the final diluted composition 103 and/or 202 would meet the corrosion specifications of Specification 5100-304d (Jan. 7, 2020) for aluminum, steel, brass, and magnesium. For example, in a preferred embodiment the aluminum corrosion is less than about 2.0 mils/year, preferably less than about 1.0 mils/year, and more preferably less than about 0.5 mils/year. In a preferred embodiment, the steel corrosion is less than about 5.0 mils/year, preferably less than about 4.0 mils/year, more preferably less than about 3.0 mils/year. In a preferred embodiment, the brass corrosion is less than about 5.0 mils/year, preferably less than about 4.0 mils/year, more preferably less than about 3.0 mils/year. In a preferred embodiment, the magnesium corrosion is less than about 4.0 mils/year, preferably less than about 3.0 mils/year, more preferably less than about 2.0 mils/year.

Toxicity Testing

Rainbow Trout (*Oncorhynchus mykiss*), 53 days-post-hatch were exposed to the forest fire retardant composition of Examples 1-3, 5-8, and 10 for 96 (±2) hours following the procedures outlined in USDA Forest Service Standard Test Procedure STP-1.5—Fish Toxicity (available at http://www.fs.fed.us/rm/fire/wfcs/tests/stp01_5.htm) and the U.S. Environmental Protection Agency, Office of Prevention, Pesticides, and Toxic Substances. Fish Acute Toxicity Test, Freshwater and Marine; 850.1075, both incorporated herein by reference in its entirety. The fish were maintained in aerated aquaria containing EPA synthetic soft water at 12° C. for nine days prior to their use in this test. The $LC_{50}$ Acute Fish Toxicity Test rates the acute chemical toxicity to fish wherein the numeric value indicates the lethal concentration point at which the chemical results in 50% mortality of fingerling Rainbow Trout. The $LC_{50}$ values for the final diluted composition 103 and/or 202 of Examples 1-3, 5-8, and 10 were derived from the USFS 96-hour acute aquatic toxicity test (STP-1.5). The results are shown below in Table 58.

TABLE 58

| $LC_{50}$ Acute Fish Toxicity Test | |
|---|---|
| Long Term Retardant Test Products | $LC_{50}$ Test Results (mg/L) |
| Example 1 | 119 |
| Example 2 | 212 |
| Example 3 | 212 |

TABLE 58-continued

| $LC_{50}$ Acute Fish Toxicity Test | |
|---|---|
| Long Term Retardant Test Products | $LC_{50}$ Test Results (mg/L) |
| Example 5 | 369 |
| Example 6 | 522 |
| Example 7 | 424 |
| Example 8 | 1580 |
| Example 10 | 1580 |

Figure 3:
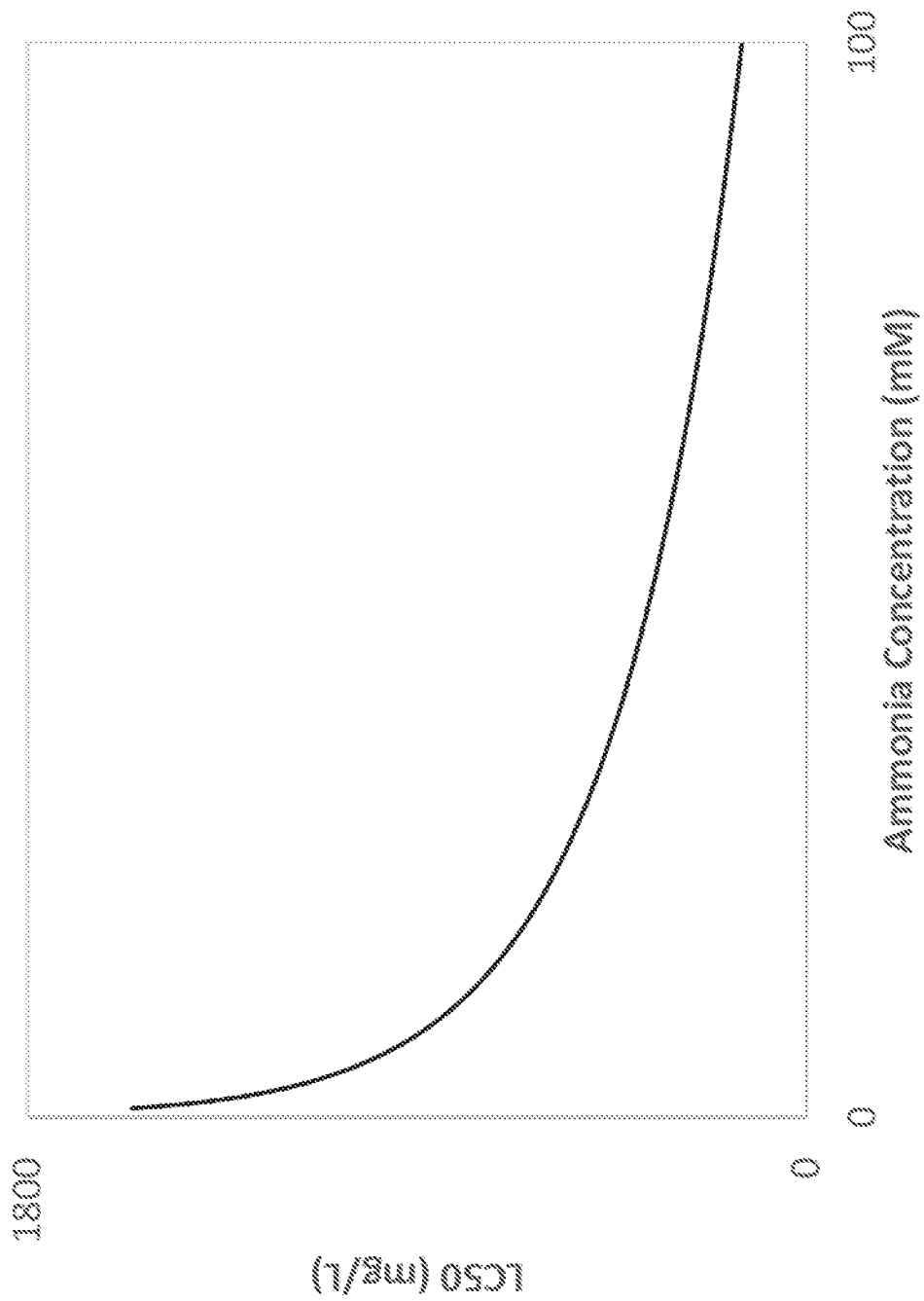
FIG. 3 is a graph illustrating the relationship between ammonia concentration and LC50.
Figure 4B:
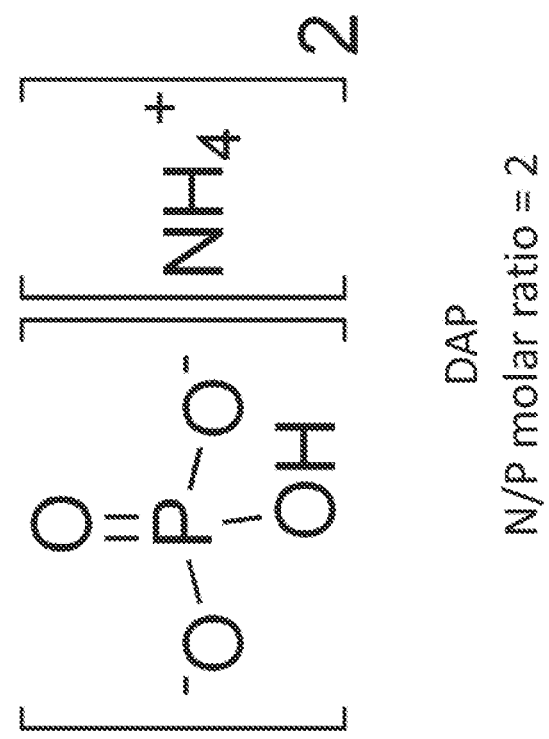
FIG. 4B illustrates the chemical structure of diammonium phosphate (DAP) and its N/P molar ratio.
Figure 4A:
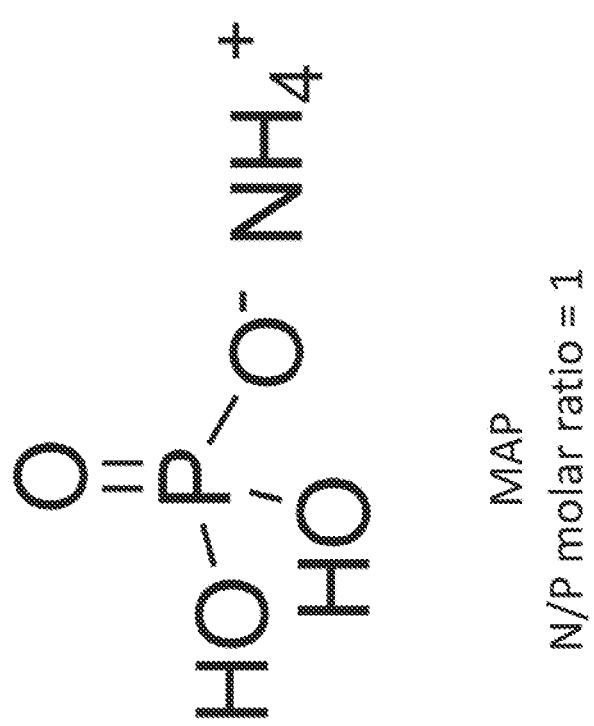
FIG. 4A illustrates the chemical structure of monoammonium phosphate (MAP) and its N/P molar ratio.

The present inventors have identified a correlation between $LC_{50}$ results and ammonia concentration, which is shown in FIG. 3. FIG. 3 illustrates the general inverse relationship between ammonia concentration and $LC_{50}$. The forest fire retardant compositions of Examples 1-28 maintain low concentrations of ammonia and have reduced toxicity while still functioning as efficient forest fire retardants with low corrosivity.

Combustion Retarding Effectiveness Testing

In a preferred embodiment, the final diluted composition 103 and/or 202 would meet the required retarding salt concentration specifications of Specification 5100-304d Section 3.6.1 (Jan. 7, 2020) and would not require a burn test. For example, the diammonium phosphate (DAP) concentration in the final diluted composition 103 and/or 202 is equal to or greater than about 10.6%. For example, the diammonium phosphate (DAP) concentration in the final diluted composition 103 and/or 202 is about 10.6% to about 20%, preferably about 10.7% to about 19%, more preferably about 10.8% to about 18%, more preferably about 11% to about 17%. In a preferred embodiment, the monoammonium phosphate (MAP) concentration in the final diluted composition 103 and/or 202 is equal to or greater than about 9.2%. For example, the monoammonium phosphate (MAP) concentration in the final diluted composition 103 and/or 202 is about 9.2% to about 20%, preferably about 9.3% to about 19%, more preferably about 9.4% to about 18%, more preferably about 9.5% to about 17%. In a preferred embodiment, the diammonium phosphate (DAP) equivalent (i.e., combinations of DAP, MAP, additional ammonium phosphate salts, and/or non-ammonium phosphate salts disclosed herein that have ammonium and phosphate concentrations equal to or greater than DAP) concentration in the final diluted composition 103 and/or 202 is equal to or greater than about 10.6%. For example, the diammonium phosphate (DAP) equivalent concentration in the final diluted composition 103 and/or 202 is about 10.6% to about 20%, preferably about 10.7% to about 19%, more preferably about 10.8% to about 18%, more preferably about 11% to about 17%.

In another embodiment, the final diluted composition 103 and/or 202 would meet the required retarding salt concentration specifications of Specification 5100-304d Section 3.6.2 (Jan. 7, 2020) in any burn tests. For example, the final diluted composition 103 and/or 202 exhibits a reduction index greater or equal to the reduction index of 10.6% diammonium phosphate (DAP).

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

In the claims, as well as in the specification, any ingredient listed in an open-ended list of ingredients shall not be negated or avoided by the addition of water or other solvent or reactant that might cause a chemical change to such ingredient. Thus, for example, even though it is known that an anhydrous salt becomes hydrated in the presence of water, the inventors hereby act as their own lexicographers, so that any composition "including" or "comprising" an "anhydrous" salt is intended to cover both a dry composition substantially free of water in which the salt has substantially no water of hydration, as well as any wet composition formed by the addition of water which causes the anhydrous salt to become hydrated (or to undergo some other change). Both before and after the addition of water or other ingredient, the composition shall be regarded, for purposes of the specification and claims, as comprising an "anhydrous" salt irrespective of any hydration, solvation, or other change caused by the addition of water or other ingredient. The same applies for any ingredient recited in an open-ended list which might be chemically changed by the addition of water or other ingredient to the open-ended list.

The invention claimed is:

1. A forest fire retardant concentrate, comprising:
a retardant compound comprising:
diammonium phosphate; and
at least one of disodium phosphate, monosodium phosphate, or dipotassium phosphate;
a corrosion inhibitor for at least one of iron, brass, aluminum, or magnesium present in the concentrate in an amount having a weight percent of about 0.1% to about 3.0% relative to the total weight of the concentrate; and a thickening agent, present in the concentrate in an amount having a weight percent of about 0.75% to about 5.0% relative to the total weight of the concentrate;

wherein:
the concentrate has a molar ratio of ammoniacal nitrogen to phosphorus (N/P molar ratio) of less than about 1.1; and
the corrosion inhibitor comprises an alkyl amine, one or more azoles, and disodium molybdate dihydrate.

2. The concentrate of claim 1, wherein the thickening agent comprises at least one of a polyurethane, a polyvinyl alcohol, an acrylic polymer, a gum, a cellulosic, a sulfonate, a saccharide, a clay, an organosilicone, or a protein.

3. The concentrate of claim 1, further comprising a colorant, present in the concentrate in an amount having a weight percent of about 0.04% to about 6.0% relative to the total weight of the concentrate, wherein the colorant comprises at least one of an inorganic pigment and an organic pigment.

4. The concentrate of claim 1, further comprising monoammonium phosphate.

5. The concentrate of claim 1, further comprising a buffering agent present in the concentrate in an amount having a weight percent of about 3% to about 56% relative to the total weight of the concentrate.

6. The concentrate of claim 1, wherein the concentrate is a dry concentrate having no more than about 3% by weight of water relative to the total weight of the dry concentrate.

7. The concentrate of claim 6, wherein the retardant compound is present in the dry concentrate in an amount having a weight percent of about 62% to about 99% relative to the total weight of the dry concentrate.

8. The concentrate of claim 1, further comprising water; wherein:
the concentrate is a final diluted product intended for use to suppress, retard, or contain forest fires;
the retardant compound is present in the final diluted product in an amount having a weight percent of about 6% to about 28% relative to the total weight of the final diluted product; and
the pH of the final diluted product is about 6.1 to about 7.9.

9. A forest fire retardant concentrate, comprising:
a retardant compound comprising:
diammonium phosphate; and
at least one of disodium phosphate, monosodium phosphate, or dipotassium phosphate;
a corrosion inhibitor for at least one of iron, brass, aluminum, or magnesium present in the concentrate in an amount having a weight percent of about 0.1% to about 3.0% relative to the total weight of the concentrate;
a thickening agent, present in the concentrate in an amount having a weight percent of about 0.75% to about 5.0% relative to the total weight of the concentrate; and
a surfactant present in the concentrate in an amount having a weight percent of about 0.04% to about 2.5% relative to the total weight of the concentrate;
wherein:
the concentrate has a molar ratio of ammoniacal nitrogen to phosphorus (N/P molar ratio) of less than about 1.1; and
the surfactant comprises a 10% active silicone emulsion.

10. The concentrate of claim 9, wherein the thickening agent comprises at least one of a polyurethane, a polyvinyl alcohol, an acrylic polymer, a gum, a cellulosic, a sulfonate, a saccharide, a clay, an organosilicone, or a protein.

11. The concentrate of claim 9, further comprising a colorant, present in the concentrate in an amount having a weight percent of about 0.04% to about 6.0% relative to the total weight of the concentrate, wherein the colorant comprises at least one of an inorganic pigment and an organic pigment.

12. The concentrate of claim 9, further comprising monoammonium phosphate.

13. The concentrate of claim 9, further comprising a buffering agent present in the concentrate in an amount having a weight percent of about 3% to about 56% relative to the total weight of the concentrate.

14. The concentrate of claim 9, wherein the concentrate is a dry concentrate having no more than about 3% by weight of water relative to the total weight of the dry concentrate.

15. The concentrate of claim 14, wherein the retardant compound is present in the dry concentrate in an amount having a weight percent of about 62% to about 99% relative to the total weight of the dry concentrate.

16. The concentrate of claim 9, further comprising water; wherein:
the concentrate is a final diluted product intended for use to suppress, retard, or contain forest fires;
the retardant compound is present in the final diluted product in an amount having a weight percent of about 6% to about 28% relative to the total weight of the final diluted product; and
the pH of the final diluted product is about 6.1 to about 7.9.

17. A forest fire retardant concentrate, comprising:
a retardant compound comprising:
monoammonium phosphate;
disodium phosphate; and
an ammonium source;
a corrosion inhibitor for at least one of iron, brass, aluminum, or magnesium present in the concentrate in an amount having a weight percent of about 0.1% to about 3.0% relative to the total weight of the concentrate; and
a thickening agent, present in the concentrate in an amount having a weight percent of about 0.75% to about 5.0% relative to the total weight of the concentrate;
wherein:
the concentrate has a molar ratio of ammoniacal nitrogen to phosphorus (N/P molar ratio) of less than about 1.1; and
the corrosion inhibitor comprises an alkyl amine, one or more azoles, and disodium molybdate dihydrate.

18. The concentrate of claim 17, wherein the ammonium source comprises at least one of diammonium phosphate, sodium ammonium phosphate, sodium ammonium phosphate hydrate, ammonium chloride, ammonium acetate, ammonium citrate, ammonium sulfate, or diammonium phosphate.

19. The concentrate of claim 18, wherein the N/P ratio is about 0.5 to about 0.9.

20. The concentrate of claim 17, wherein the thickening agent comprises at least one of a polyurethane, a polyvinyl alcohol, an acrylic polymer, a gum, a cellulosic, a sulfonate, a saccharide, a clay, an organosilicone, or a protein.

21. The concentrate of claim 17, further comprising a colorant, present in the concentrate in an amount having a weight percent of about 0.04% to about 6.0% relative to the total weight of the concentrate, wherein the colorant comprises at least one of an inorganic pigment and an organic pigment.

22. The concentrate of claim 17, further comprising a buffering agent present in the concentrate in an amount having a weight percent of about 3% to about 56% relative to the total weight of the concentrate.

23. The concentrate of claim 17, wherein the concentrate is a dry concentrate having no more than about 3% by weight of water relative to the total weight of the dry concentrate.

24. The concentrate of claim 23, wherein the retardant compound is present in the dry concentrate in an amount having a weight percent of about 62% to about 99% relative to the total weight of the dry concentrate.

25. The concentrate of claim 17, further comprising water;
wherein:
the concentrate is a final diluted product intended for use to suppress, retard, or contain forest fires;
the retardant compound is present in the final diluted product in an amount having a weight percent of about 6% to about 28% relative to the total weight of the final diluted product; and
the pH of the final diluted product is about 5.2 to about 6.8.

26. A forest fire retardant concentrate, comprising:
a retardant compound comprising:
monoammonium phosphate;
disodium phosphate; and
an ammonium source;
a corrosion inhibitor for at least one of iron, brass, aluminum, or magnesium present in the concentrate in an amount having a weight percent of about 0.1% to about 3.0% relative to the total weight of the concentrate;
a thickening agent, present in the concentrate in an amount having a weight percent of about 0.75% to about 5.0% relative to the total weight of the concentrate; and
a surfactant present in the concentrate in an amount having a weight percent of about 0.04% to about 2.5% relative to the total weight of the concentrate;
wherein:
the concentrate has a molar ratio of ammoniacal nitrogen to phosphorus (N/P molar ratio) of less than about 1.1; and
the surfactant comprises a 10% active silicone emulsion.

27. The concentrate of claim 26, wherein the ammonium source comprises at least one of diammonium phosphate, sodium ammonium phosphate, sodium ammonium phosphate hydrate, ammonium chloride, ammonium acetate, ammonium citrate, ammonium sulfate, or diammonium phosphate.

28. The concentrate of claim 27, wherein the N/P ratio is about 0.5 to about 0.9.

29. The concentrate of claim 26, wherein the thickening agent comprises at least one of a polyurethane, a polyvinyl alcohol, an acrylic polymer, a gum, a cellulosic, a sulfonate, a saccharide, a clay, an organosilicone, or a protein.

30. The concentrate of claim 26, further comprising a colorant, present in the concentrate in an amount having a weight percent of about 0.04% to about 6.0% relative to the total weight of the concentrate, wherein the colorant comprises at least one of an inorganic pigment and an organic pigment.

31. The concentrate of claim 26, further comprising a buffering agent present in the concentrate in an amount having a weight percent of about 3% to about 56% relative to the total weight of the concentrate.

32. The concentrate of claim 26, wherein the concentrate is a dry concentrate having no more than about 3% by weight of water relative to the total weight of the dry concentrate.

33. The concentrate of claim 32, wherein the retardant compound is present in the dry concentrate in an amount having a weight percent of about 62% to about 99% relative to the total weight of the dry concentrate.

34. The concentrate of claim 26, further comprising water;
wherein:
the concentrate is a final diluted product intended for use to suppress, retard, or contain forest fires;
the retardant compound is present in the final diluted product in an amount having a weight percent of about 6% to about 28% relative to the total weight of the final diluted product; and
the pH of the final diluted product is about 5.2 to about 6.8.

* * * * *